United States Patent [19]

Ueda et al.

[11] Patent Number: 5,459,596
[45] Date of Patent: Oct. 17, 1995

[54] ACTIVE MATRIX LIQUID CRYSTAL DISPLAY WITH SUPPLEMENTAL CAPACITOR LINE WHICH OVERLAPS SIGNAL LINE

[75] Inventors: Tomomasa Ueda, Yokohama; Masahiko Akiyama; Atsushi Sugahara, both of Tokyo; Makoto Shibusawa, Odawara; Mitsushi Ikeda, Yokohama; Yoshiko Tsuji, Kawasaki; Hisao Toeda, Yokohama, all of Japan

[73] Assignee: Kabushiki Kaisha Toshiba, Kanagawa, Japan

[21] Appl. No.: 38,989

[22] Filed: Mar. 29, 1993

[30] Foreign Application Priority Data

Sep. 14, 1992 [JP] Japan ............................ 4-245121

[51] Int. Cl.⁶ .................... G02F 1/1343; G02F 1/1335
[52] U.S. Cl. .................... 359/59; 359/87; 359/67; 359/54
[58] Field of Search .................... 359/59, 54, 84, 359/87, 67; 257/59, 60

[56] References Cited

U.S. PATENT DOCUMENTS

| | | | |
|---|---|---|---|
| 5,151,806 | 9/1992 | Kawamoto et al. | 359/59 |
| 5,162,901 | 10/1992 | Shimada et al. | 359/59 |
| 5,282,070 | 1/1994 | Nishida et al. | 359/87 |
| 5,285,301 | 2/1994 | Shirahashi et al. | 359/87 |

FOREIGN PATENT DOCUMENTS

| | | |
|---|---|---|
| 0136509 | 4/1985 | European Pat. Off. . |
| 0466495 | 1/1992 | European Pat. Off. . |
| 0544061 | 8/1993 | European Pat. Off. . |
| 2-63020 | 3/1990 | Japan . |
| 3271719 | 12/1991 | Japan . |
| 4264529 | 9/1992 | Japan . |

OTHER PUBLICATIONS

Optimisation of Very Small Pitch Active Matrix LCD For Projection, J. M. Vignolle et al., Conference Record of the IDRC, 223–226 (1991).

Patent Abstracts of Japan, No. JP1024232, vol. 013203, May 1989.

Primary Examiner—William L. Sikes
Assistant Examiner—Kenneth Parker
Attorney, Agent, or Firm—Finnegan, Henderson, Farabow, Garrett & Dunner

[57] ABSTRACT

An active matrix type liquid crystal display device having a plurality of scan lines, a plurality of signal lines intersected with the plurality of scan lines, the plurality of scan lines being insulated from the plurality of signal lines, a thin film transistor element having a gate portion and a drain portion and disposed at each intersection of the plurality of scan lines and the plurality of signal lines, the gate portion being connected to a scan line at the intersection, the drain portion being connected to a signal line at the intersection, an array substrate formed in the intersection and having a pixel electrode, the pixel electrode being electrically connected to the source portion of the thin film transistor element, an opposite substrate having an opposite electrode opposed to the array substrate, a liquid crystal layer disposed between the array substrate and the opposite substrate, and a shield electrode disposed on the array substrate, the shield electrode being overlaid through an insulation layer with at least part of the pixel electrode and with at least part of at least either the scan line or signal line.

6 Claims, 26 Drawing Sheets

1PEP Gate

2PEP Pixel

3PEP i/s

4PEP Through hole

5PEP Signal n+ & a-Si cut

6PEP Passivation

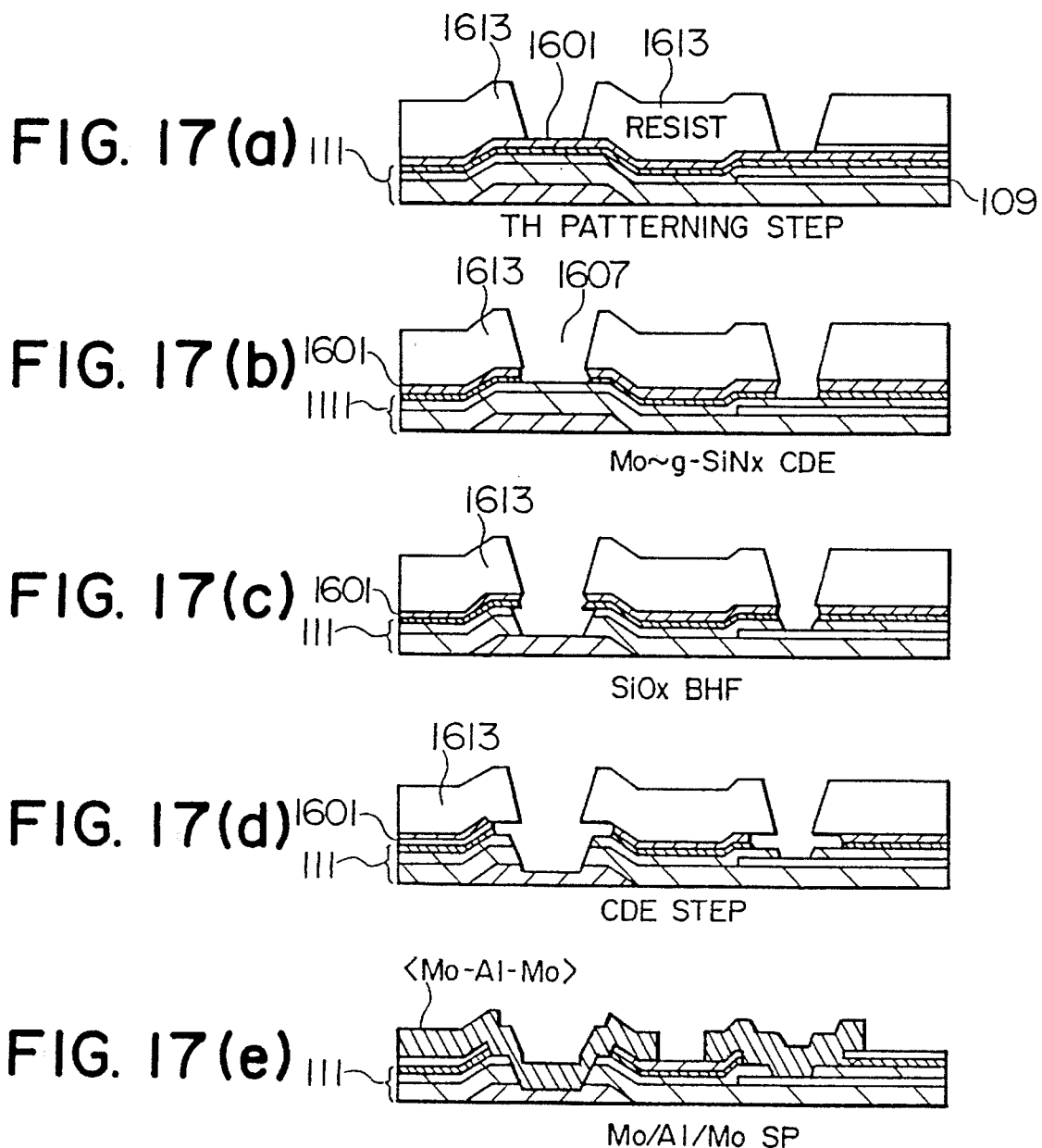

FIG. 39
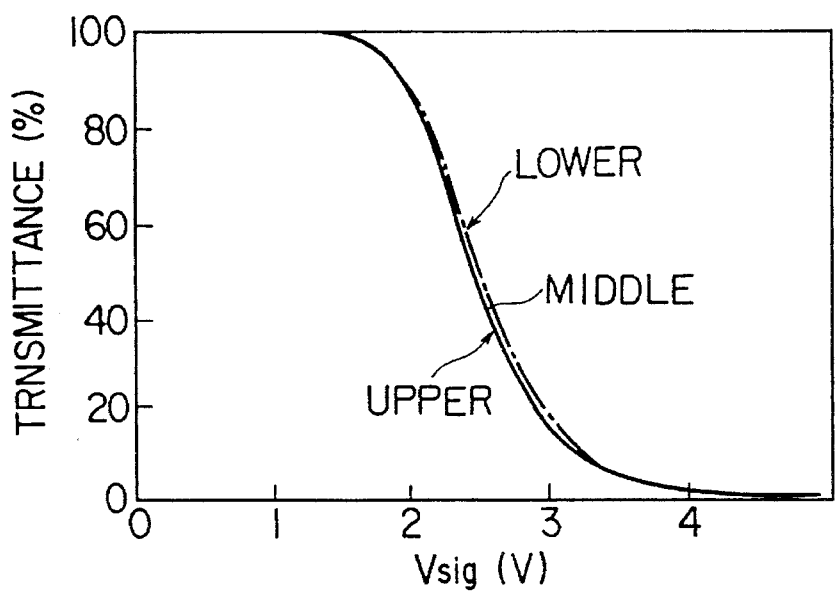
(a) WITH SHIELD ELECTRODE STRUCTURE
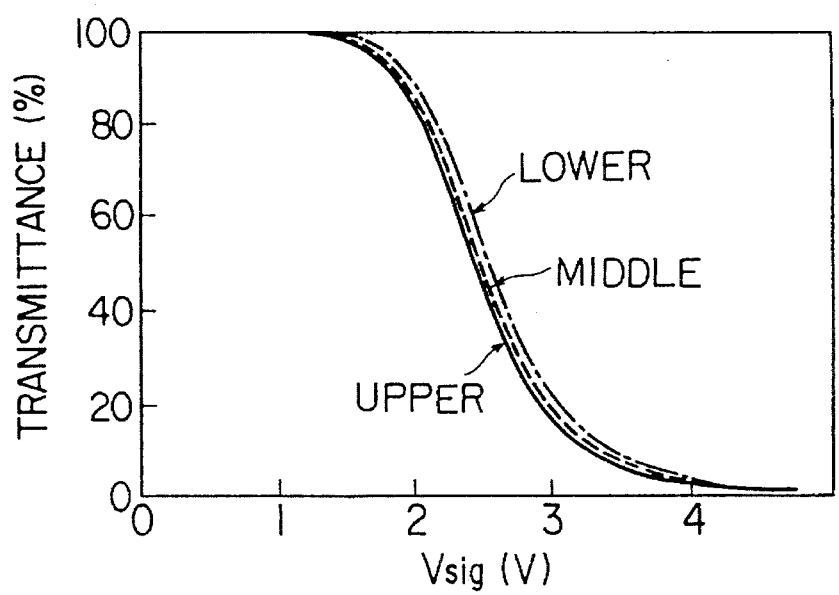
(b) CONVENTIONAL

ACTIVE MATRIX LIQUID CRYSTAL DISPLAY WITH SUPPLEMENTAL CAPACITOR LINE WHICH OVERLAPS SIGNAL LINE

BACKGROUND OF THE INVENTION

1. Field of the Invention

The present invention relates to a liquid crystal display device, in particular, to an active matrix liquid crystal display device with a thin film transistor.

2. Description of the Related Art

In recent years, the size, weight, and power consumption of electronic device are being reduced. In the display device field, flat panel displays which are small in size, light in weight, and less in power consumption are being studied and developed as substitutes of conventional CRT (Cathode Ray Tube).

Among the flat panel display device, a liquid crystal display device has various features such as large display area, full colors, and low current and low voltage operation, and so forth. The liquid crystal display device which are currently available can be categorized according to operating systems. In particular, an active matrix liquid crystal display device has attractive features such as full-color moving picture display and high resolution.

In the active matrix type liquid crystal display device, one picture element (hereinafter referred to as a pixel) is disposed at each intersection of electrodes which are disposed in a matrix shape. In addition, one switching device is disposed at each pixel so as to independently drives and controls the pixel connected thereto. For these switching devices, thin film transistors (TFTs) are practically used. For example, liquid crystal display device with a diagonal length of 10 inches and pixels of 480 (height) ×640 (wide) have been used as lap top computer display devices. In addition, direct viewing type display devices with very high picture display quality and very high resolution and projection type display devices with fine pitch and very high resolution are being studied and developed.

FIGS. 28, 29, and 30 show the construction of an active matrix type liquid crystal display device using a TFT. FIG. 28 is a partial schematic diagram showing a pixel of a TFT array substrate. FIG. 29 is a circuit diagram showing an equivalent circuit of the pixel. Scan lines 2801 and signal lines 2803 are intersectionally disposed in a matrix shape over a glass substrate. A TFT 2805 is connected to a scan line 2801 and a signal line 2803. In addition, the TFT 2805 is connected to a pixel electrode 2807. Over the pixel electrode 2807, a storage capacitor electrode 2809 is formed through an insulation film. Thus, a TFT array substrate 2811 is formed. The storage capacitor electrode 2809 and the pixel electrode 2807 form a storage capacitance $C_s$.

FIG. 30 is a sectional view showing the construction of an active matrix type liquid crystal display device. A liquid crystal display device is hereinafter referred to as an LCD. The LCD comprises a TFT array substrate 2811, an opposite substrate 2813 with opposite electrode, alignment layers 2817, and a liquid crystal layer 2815. The TFT array substrate 2811 is opposed to the opposite substrate 2813. The liquid crystal layer 2815 is disposed between the TFT array substrate 2811 and the opposite substrate 2813 through the respective alignment layers 2817.

In this device, while the scan line 2801 is selected, the TFT 2805 is turned on (power on state). Thus, with a voltage applied through the signal line 2803, a capacitance $C_{LC}$ of liquid crystal and a capacitance $C_s$ of the storage capacitor are formed. The $C_{LC}$ is formed of the pixel electrode 2807, the opposite electrode, and the liquid crystal layer 2815. On the other hand, the $C_s$ is formed over the TFT array substrate 2811. While the scan line 2801 is not selected, the TFT 2805 is turned off (high resistance state). Thus, the pixel electrode 2807 is electrically disconnected from the signal line 2803. While the scan line is selected and a voltage exceeding a lighting threshold value is applied with the electric charge to the liquid crystal layer 2815, the lighting state of the pixel is kept.

However, in the active matrix type LCD using the above-mentioned TFT, electrostatic capacitances $C_{gs}$ and $C_{ds}$ as parasitic capacitances are formed between the pixel electrode 2807 and the scan line 2801 and between the pixel electrode 2807 and the signal line 2803, respectively. With these parasitic capacitances $C_{gs}$, and $C_{ds}$, the pixel electrode 2807 is coupled with the scan line 2801 and the signal line 2803. Thus, voltage fluctuations of the scan line 2801 and the signal line 2803 adversely affect the voltage of the pixel electrode 2807, thereby varying the voltage of noise.

In particular, when a scanning pulse goes down, a voltage fluctuation $\Delta V_p$ takes place and adversely affects the scan line 2801. This voltage fluctuation is referred to as a pixel voltage shift.

This voltage fluctuation $\Delta V_p$ is given by the following equation.

$$\Delta V_p = \{C_{gs}/(C_{LC}+C_s+C_{gs}+C_{ds})\} \times \Delta V_g$$

where $C_{gs}$ is the parasitic capacitance formed between the pixel electrode and the scan line; $C_{LC}$ is the capacitance of the liquid crystal layer; $C_s$ is the storage capacitance; and $C_{ds}$ is the parasitic capacitance formed between the pixel electrode and the signal line.

When the voltage fluctuation $\Delta V_p$ takes place, the voltage of the pixel electrode 2807 differs from a predetermined signal voltage applied to the signal line 2803. Thus, a signal voltage cannot be correctly applied. According to a related art reference, to solve this problem, the voltage of the opposite electrode is shifted for the voltage fluctuation $\Delta V_p$ so as to compensate the voltage fluctuation $\Delta V_p$.

However, the capacitance $C_{LC}$ is not constant, but varies depending on the voltage applied to the liquid crystal and the orientation of liquid crystal molecules. In addition, due to a restriction in production, the fluctuations of the capacitances $C_{gs}$, $C_s$, and $C_{LC}$ in the display cannot be kept constant. Thus, on the same display, the voltage fluctuation $\Delta V_p$ is not constant, but varies position by position. Therefore, the voltage fluctuation $\Delta V_p$ cannot be satisfactorily compensated with an adjustment of the voltage of the opposite electrode disposed on opposite substrate 2813. Thus, on the display, a flickering and/or an image sticking takes place.

On the other hand, the voltage of the signal line 2803 does not accord with a picture signal voltage, but varies time by time. Thus, the voltage fluctuation of the pixel electrode 2807 affected by the signal line 2803 more frequently and variously takes place than the voltage fluctuation by the scan line 2801. As an example, under frame inversion drive, a voltage fluctuation takes place at every frame. Next, this voltage fluctuation will be described.

The polarity of the voltages of all the signal lines 2803 are inverted at every frame. Thus, when the polarity is changed, the voltages of the signal lines 2803 most largely fluctuate. The voltage fluctuation $\Delta V_{ps}$ of the pixel electrode 2807 at this point can be given by the following equation.

$$\Delta V_{ps} = (C_{ds1} \times \Delta V_{sig1} + C_{ds2} \times \Delta V_{sig2}) / (C_{LC} + C_s + C_{gs} + C_{ds1} + C_{ds2})$$

where $\Delta V_{sig1}$ and $\Delta V_{sig2}$ are the voltage fluctuations of the left-side and right-side signal lines 2803 which form parasitic capacitances along with the pixel electrode 2807, respectively; and $C_{ds1}$ and $C_{ds2}$ are the parasitic capacitances thereof.

Whenever the polarity of the voltage of signal lines is inverted (in other words, a pixel sequence is charged at the lowest line of the display), this voltage fluctuation $\Delta V_{ps}$ takes place. Thus, a time after a signal voltage is applied until the $\Delta V_{ps}$ takes place varies vertically position by position. Thus, the brightness of the display varies position by position. This fluctuation which is referred to as the unevenness of luminance of display is observed.

When the capacitances $C_{ds1}$ and $C_{ds2}$ become large, the voltage fluctuation of the signal line 2803 causes the voltage of the pixel electrode 2807 to fluctuate and thereby a crosstalk takes place.

These parasitic capacitances of the TFT array substrate 2811 are formed in the following positions. The capacitance $C_{gs}$ is formed at overlapped portions between the channel portion of the TFT 2805 and the scan line 2801 and between the gate electrode and the pixel electrode 2807 (source electrode). On the other hand, the parasitic capacitances $C_{ds1}$ and $C_{ds2}$ are formed at positions where the pixel electrode 2807 and the signal line 2803 are closely disposed.

As described above, when small size and high resolution of the LCDs are accomplished and the size of one pixel is decreased, the distance between each adjacent electrode should be shortened so as to improve the open aperture ratio of the pixel and the luminance. However, when the distance between each adjacent electrode is short, the parasitic capacitances $C_{gs}$, $C_{ds1}$, and $C_{ds2}$ disproportionally increase. Thus, the unevenness of luminance and crosstalk frequently take place, thereby degrading the picture display quality.

In addition, to prevent the contrast of the pixel from degrading due to penetration of rays of light to the opening between the scan line 2801 and the signal line 2803 and between the scan line 2801 and the pixel electrode 2807 and to prevent the TFT 2805 from malfunctioning due to an leakage current caused by rays of light entered thereto, a light shielding film referred to as a black matrix or a black mask is conventionally used. Normally, the black matrix is disposed on the opposite substrate side. When the TFT array substrate 2811 and the opposite substrate 2813 are oppositely disposed, the opening portion of the black matrix is opposed to the opening portion of pixel electrode.

However, when the size of each pixel is further decreased due to small size and high resolution of the LCD, it is necessary to form a pixel electrode and a black matrix in a finer pattern size and with a higher accuracy so as to improve the open aperture ratio of the pixel and the brightness thereof. In addition, the opposite substrate 2813 and the TFT array substrate 2811 should be more finely aligned. Thus, the production of the LCD becomes more difficult.

When the size of each pixel is decreased, the pattern accuracy and the alignment tolerance of the pixel electrode and the black matrix become strict and severer. Thus, their production becomes harder and harder.

In addition, in the overlap of the storage capacitor electrode 2809 and the pixel electrode 2807, a shortcircuit and a current leak sometimes take place. Thus, display defects such as point defects occasionally occur. Due to these display defects, the yield of the production of the conventional active matrix type LCDs was low. In particular, the storage capacitor electrode 2809 was devised so as to keep a good picture display for a predetermined long time.

However, as described above, since display defects such as point defects took place, the conventional LCDs had a practical problem.

SUMMARY OF THE INVENTION

An object of the present invention is to provide an active matrix type LCD for allowing parasitic capacitances formed between each pixel electrode and each scan line and between each pixel electrode and each signal line which are closely disposed to be decreased so as to prevent an uneven luminance and a crosstalk of display pictures and to accomplish a good picture display.

Another object of the present invention is to provide an active matrix type LCD which allows display defects such as point defects on the display caused by a shortcircuit or a current leakage between a storage capacitor electrode or another electrode such as a signal line and an pixel electrode so as to accomplish a high picture display quality.

The first aspect of the present invention is an active matrix type liquid crystal display device, comprising an array substrate, the array substrate comprising a plurality of scan lines formed on a substrate, a plurality of signal lines intersected with the plurality of scan lines, the plurality of scan lines being insulated from the plurality of signal lines, a thin film transistor element having a gate portion and a drain portion and disposed at each intersection of the plurality of scan lines and the plurality of signal lines, the gate portion being connected to a scan line at the intersection, the drain portion being connected to a signal line at the intersection, a pixel electrode being electrically connected to the source portion of the thin film transistor element, an opposite substrate having an opposite electrode opposed to the array substrate, a liquid crystal layer disposed between the array substrate and the opposite substrate, and a shield electrode disposed on the array substrate, the shield electrode being overlaid through an insulation layer with at least part of the pixel electrode and with at least part of at least one line selected from said scan line and signal line.

According to the LCD of the present invention, the shield electrode is disposed, so that the paracitic capacitances formed between the pixel electrode and the scan line and between the pixel electrode and the signal line are reduced by the electrostatic shielding effect.

The shield electrode may be in an electrically floating state or in a state where a voltage is applied.

The shield electrode can be used in common with one electrode of the storage capacitor connected in parallel with the liquid crystal capacitor of the pixel.

The parasitic capacitances formed between the pixel electrode and the scan line and between the pixel electrode and the signal line are largely affected by an electric line of force which depends on the shapes of the two electrodes, the permittivity of the surrounding substances, and so forth.

When a shield electrode with a constant voltage is disposed between two electrodes of the pixel electrode and a signal line, the electric line of force which normally passes between the pixel electrode and the signal line is shielded or reduced by the electrostatic shielding effect of the shield electrode.

In addition, this electrostatic shielding effect satisfactorily takes place, not only when a shield electrode is disposed so as to extend between two electrodes of a pixel electrode and signal line, but also when the two electrodes are overlapped through respective insulation layers or the like disposed over or below thereof. When the electric line of force is shielded or reduced, the parasitic capacitance formed between two electrodes such as the pixel electrode and the signal line decreases. FIG. 38 shows an effect of the shield electrode disposed at a lower portion of the pixel electrode and the signal line.

According to the LCD of the present invention, with the shield electrode which is overlapped through the insulation layer with at least part of the pixel electrode and with at least part of at least either the scan line or the signal line, the parasitic capacitances can be removed, thereby preventing an uneven luminance and crosstalk from taking place and accomplishing a high picture display quality.

Moreover, since the shield electrode is overlapped with the pixel electrode, a part of the overlapped portion of the shield electrode can be used in common with a storage capacitor electrode for forming a storage capacitance of an insulation film as a dielectric.

The second aspect of the present invention is an active matrix type liquid crystal display device, comprising a plurality of scan lines, a plurality of signal lines intersected with the plurality of scan lines, the plurality of scan lines being insulated from the plurality of signal lines, a thin film transistor element having a gate portion and a drain portion and disposed at each intersection of the plurality of scan lines and the plurality of signal lines, the gate portion being connected to a scan line at the intersection, the drain portion being connected to a signal line at the intersection, an array substrate formed in the intersection and having a pixel electrode, the pixel electrode being electrically connected to a source portion of the thin film transistor element, an opposite substrate having an opposite electrode opposed to the array substrate, a liquid crystal layer disposed between the array substrate and the opposite substrate, and a semiconductor film composed of an activation layer and an ohmic contact layer of the thin film transistor element overlaid with at least part of the pixel electrode.

In addition, the semiconductor film of the thin film transistor element can be extended. Thus, both the semiconductor film overlapped with the pixel electrode and the semiconductor films of the thin film transistor element can be integrally formed. Alternatively, the semiconductor film can be separated from the semiconductor film of the thin film transistor element until the production step of the array substrate is completed.

Moreover, the semiconductor film can be connected to a particular external power supply with a particular voltage at least in the production process of the LCD. Alternatively, the semiconductor film can be connected to the ground at least in the production process. After the LCD is completed, the semiconductor film can be disconnected from the ground or kept connected thereto.

As a material of the activation layer which is a material of the semiconductor film, a conventional semiconductor material such as a—Si which is used for the activation layer of a conventional TFT can be used.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 2 (b) is a sectional view taken along line IIb—IIb showing the construction of layers of FIG. 1;

FIG. 2 (c) is a sectional view showing the construction of the LCD according to the first embodiment;

FIG. 4 (b) is a sectional view taken along line IVb—IVb showing the construction of layers of FIG. 3;

FIG. 8 (b) is a sectional view taken along line VIIIb—VIIIb showing the construction of layers of FIG. 7;

FIG. 12 (b) is a sectional view taken along line XIIb—XIIb showing the construction of layers of FIG. 11;

FIG. 14 (b) is a sectional view taken along line XIVb—XIVb showing the construction of layers of FIG. 13;

FIGS. 17 (a) to (e) are sectional views showing a through-hole forming process of the array substrate according to the ninth embodiment;

FIG. 23 (b) is a sectional view showing the construction of layers on a scan line side of the array substrate according to the tenth embodiment;

FIG. 24 (b) is a sectional view showing the construction of the first modification on the scan line side of the array substrate according to the tenth embodiment;

FIG. 33 (b) is a sectional view taken along line XXXIIIb—XXXIIIb showing the construction of layers of FIG. 33 (a);

FIG. 34 (b) is a sectional view taken along line XXX-IVb—XXXIVb showing the construction of layers of FIG. 34 (a);

FIG. 35 (b) is a sectional view taken along line XXXVb—XXXVb showing the construction of layers of FIG. 35 (a);

FIG. 36 (b) is a sectional view taken along line XXX-VIb—XXXVIb showing the construction of layers of FIG. 36 (a);

FIG. 39 (a) is a schematic diagram showing transmittance-voltage characteristics at upper, middle and lower positions of a display of the LCD according to the present invention; and FIG. 39 (b) is a schematic diagram showing transmittance-voltage characteristics at upper, middle and lower positions of a display of the LCD according to the related art reference.

DESCRIPTION OF PREFERRED EMBODIMENTS

With reference to the accompany drawings, LCDs according to embodiments of the present invention will be described in detail.

EMBODIMENT 1

Figure 1:
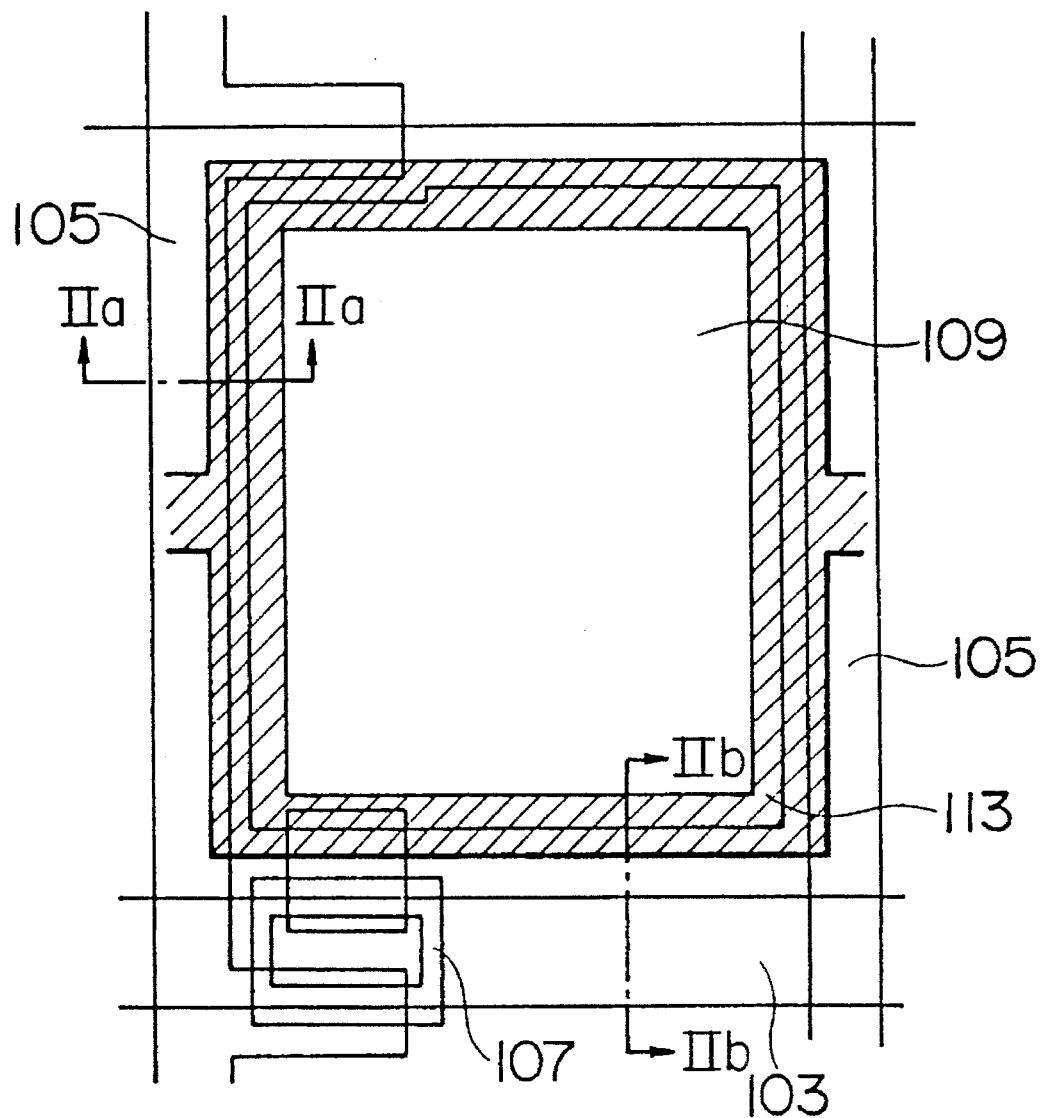
FIG. 1 is a plane diagram showing the construction of a pixel over an array substrate according to an embodiment of the present invention.
Figure 2A:
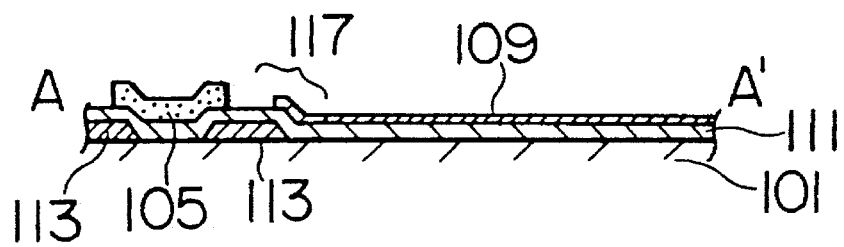
FIG. 2 (a) is a sectional view taken along line IIa—IIa showing the construction of layers of FIG. 1.
Figure 2B:
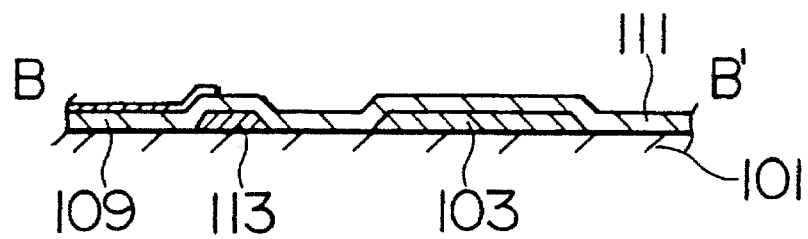
Figure 2C:
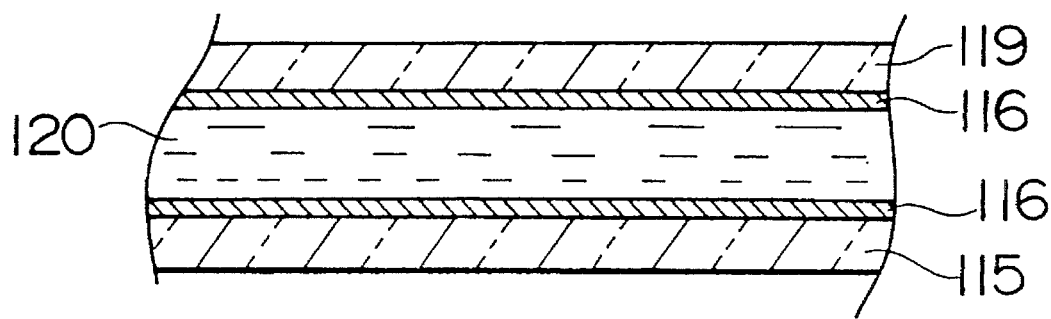

First, with reference to FIGS. 1 and 2 (a) to (c), a first embodiment of the present invention will be described.

According to an LCD of the first embodiment, scan lines 103 and signal lines 105 are intersectionally disposed on a glass substrate 101 in a matrix shape. A TFT (Thin Film Transistor) 107 is connected to a scan line 103 and a signal line 105. In addition, the TFT 107 is connected to a pixel electrode 109. A shield electrode 113 is fully overlaid with the four sides of the periphery of the pixel electrode 109 and overlapped with the signal line 105 through an insulation layer 111. Thus, a TFT array substrate 115 is formed.

The TFT array substrate 115 is opposed to an opposite electrode of an opposite substrate 119. Between the opposite substrate 119 and the TFT array substrate 115, a liquid crystal layer 120 is disposed through respective alignment layers 116.

In other words, each pixel of the LCD of the first embodiment comprises the glass substrate 101, the scan line 103, the signal line 105, the TFT 107, the pixel electrode 109, the insulation layer 111, the shield electrode 113, the opposite substrate 119, the alignment layers 116, and the liquid crystal layer 120. In FIG. 1, for simple illustration, the shield electrode layer 113 which is a feature of the present invention is hatched.

The features of the LCD according to the first embodiment are in that the shield electrode 113 is fully overlaid with the four sides of the periphery of the pixel electrode 109 and overlapped with the signal line 105 and that with the portion where the shield electrode 113 is overlaid with the pixel electrode 109 a storage capacitor 117 is formed through the gate insulation layer 111.

Next, a method for producing the LCD according to the first embodiment will be described.

A Mo—Ta alloy is deposited over the glass substrate 101 for 250 nm and patterned so as to form both the scan line 103 and the shield electrode 113 at the same time. As the gate insulation layer 111, $SiO_x$ and $SiN_x$ are formed for 300 nm and 50 nm. An a—Si alloy as an activation layer and $SiN_x$ as a channel protection film are formed over the gate insulation layer 111 for 50 nm and 200 nm, respectively. The channel protection film $SiN_x$ is etched in a land shape. A $n^+a$—Si layer as an ohmic contact layer is deposited for 50 nm. The $n^+a$—Si layer and a—Si layer are etched in a land shape. An ITO layer is deposited for 100 nm and patterned so as to form a pixel electrode 109. The gate insulation layer 111 at a lead portion of the scan line 103 is etched and removed. A Cr layer and an Al layer are deposited for 50 nm and 300 nm, respectively, and patterned so as to form the signal line 105, a drain electrode, and a source electrode. With a mask of the signal line 105, the n$^+$a—Si layer formed between the source and drain electrodes of the TFT 107 is selectively etched and removed so as to form a TFT array substrate while the channel protection layer is left.

The TFT array substrate 115 and the opposite substrate 119 are fitted and their periphery is sealed with a sealing agent. A liquid crystal material is injected between both the substrates. Thus, the LCD is completed.

According to the LCD of this embodiment, the scan line 103 and the shield electrode 113 are disposed on the same layer on the glass substrate 101. The gate insulation layer 111 is overlaid with the scan line 103 and the shield electrode 113. The pixel electrode 109 and the signal line 105 are disposed over the gate insulation layer 111. The shield electrode 113 is connected to a power supply so as to apply a predetermined voltage thereto. Thus, the voltages of the shield electrode 113 become constant on which all the pixels extend.

According to the LCD of this embodiment, electric lines of force which pass from the pixel electrode 109 to the signal line 105 can be remarkably reduced by an electrostatic shielding effect of the shield electrode 113. Thus, the parasitic capacitance which are normally formed between the pixel electrode 109 and the signal line 105 can be remarkably reduced. As a result, an uneven luminance and a crosstalk caused by the parasitic capacitance can be prevented.

In addition, since the shield electrode 113 and the scan line 103 are simultaneously formed by etching and patterning a film made of the Mo—Ta alloy deposited on the same layer thereof. Thus, without necessity of an extra step for forming the shield electrode 113, the production process can be simplified.

Moreover, the storage capacitor 117 is formed through the gate insulation layer 111 at the portion where the shield electrode 113 is overlaid with the pixel electrode 109.

In other words, since the shield electrode 113 is used in common with the storage capacitor electrode of the storage capacitor 117, the construction and production process is simpler than the construction with necessity of an extra storage capacitor electrode.

Figure 37:
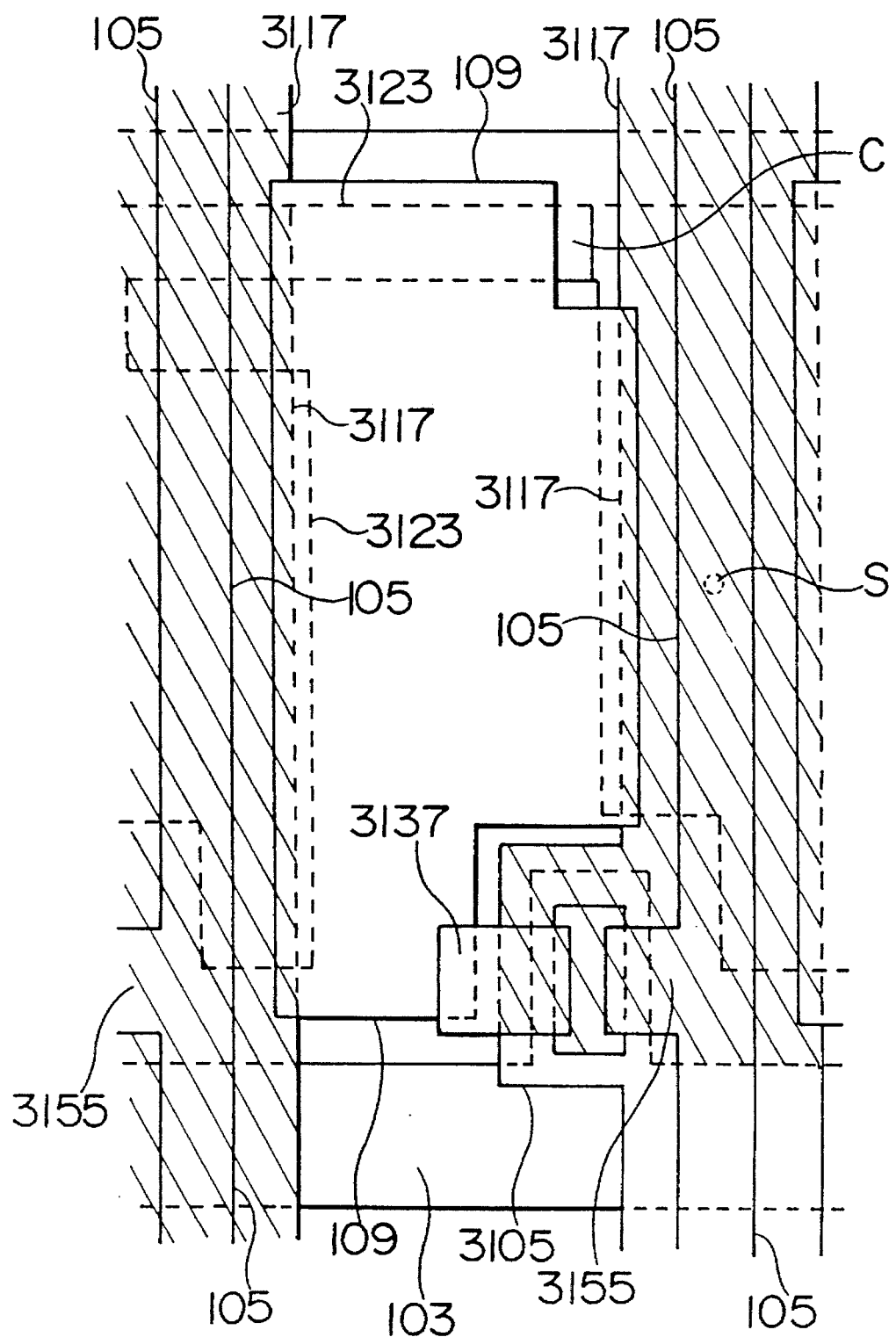
FIG. 37 is a plane view showing the construction of a second modification according to the fifteenth embodiment of the present invention.
Figure 38:
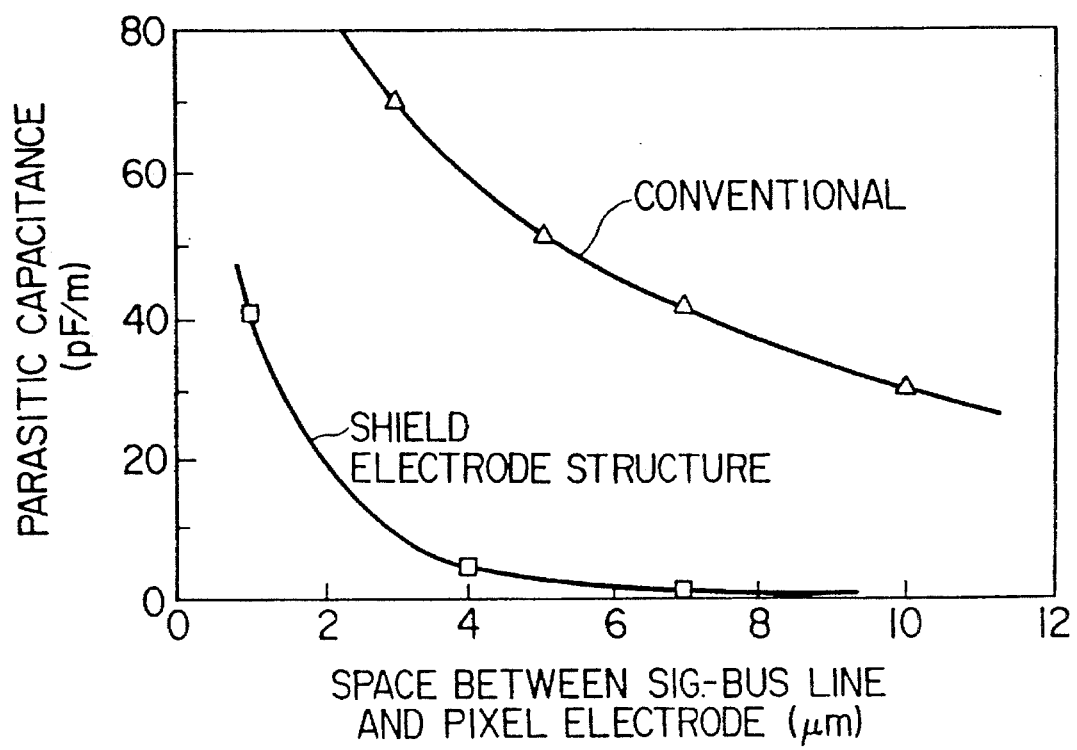
FIG. 38 is a schematic diagram showing an effect of a shield electrode.

A pixel voltage shift and a pixel voltage fluctuation caused by a frame inversion were compared between the LCD according this embodiment and the LCD according to the related art reference. The experimental results show that with the LCD having the shield electrode 113 according to this embodiment, the parasitic capacitances $C_{ds1}$ and $C_{ds2}$ which are formed between the pixel electrode 109 and the signal line 105 can be remarkably reduced. FIG. 37 (a) is a schematic diagram showing transmittance - voltage characteristics at upper, middle and lower positions of a display of the LCD according to the present invention. FIG. 39 (b) is a schematic diagram showing transmittance - voltage characteristics at upper, middle and lower positions of a display of the LCD according to the related art reference. These figures show that evenness of upper, middle and lower portions of the display is improved.

EMBODIMENT 2

Figure 3:
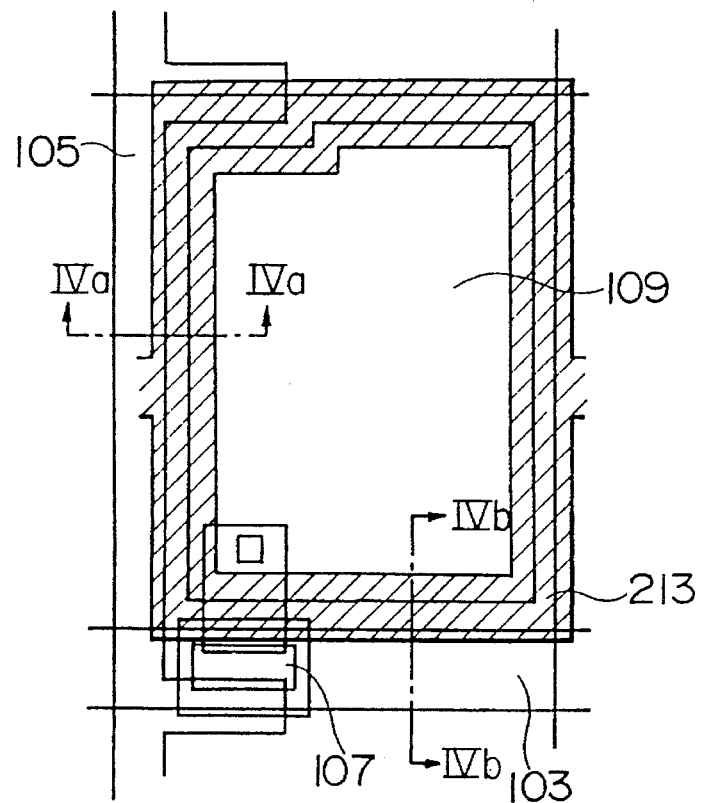
FIG. 3 is a plane view showing the construction of a pixel over an array substrate according to a second embodiment of the present invention.
Figure 4A:
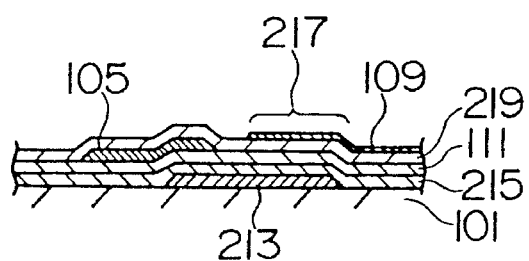
FIG. 4 (a) is a sectional view taken along line IVa—IVa showing the construction of layers of FIG. 3.
Figure 4B:
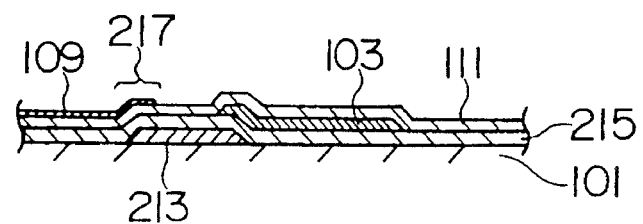

With reference to FIGS. 3 and 4 (a) and (b), a second embodiment according to the present invention will be described. For simplicity, in this embodiment, the same portions as the first embodiment are denoted by the same reference numerals as FIGS. 1 and 2 (a) and (b), and shield electrode layer is hatched.

According to the LCD of the second embodiment, a shield electrode 213 is overlapped with a scan line 103 and a signal line 105. With the shield electrode 213 as a storage capacitor electrode, a storage capacitor 217 is formed.

The shield electrode 213 is fully overlaid with all the four sides of the periphery of a pixel electrode 109 through a first gate insulation layer 111, an insulation layer 215, and a third insulation layer 219.

In addition, the shield electrode 213 is overlapped with the signal line 105 through the first gate insulation layer 111 and the insulation layer 215. Moreover, the shield electrode 213 is overlapped with the scan line 103 through the second gate insulation layer 215. The pixel electrode 109 and the signal line 105 are separated by the insulation layer 219 so as to securely prevent them from shortcircuiting.

As described in the first embodiment, with the electrostatic shielding effect of the shield electrode 213, the parasitic capacitances formed between the scan line 103 and the pixel electrode 109 and between the signal line 105 and the pixel electrode 109 can be remarkably reduced.

As a material of the shield electrode 213, a Mo—Ta alloy was used. As a material of the insulation layer 215, $SiO_x$ was used. As a material of the third insulation layer 219, $SiN_x/SiO_x$ was used.

Since a material such as the Mo—Ta alloy with a high light shielding characteristic is used for the shield electrode 213, rays of light do not penetrate the portions covered by the shield electrode 213, namely the portions between the pixel electrode 109 and the scan line 103 and between the pixel electrode 109 and the signal line 105. Instead, rays of light penetrate only the pixel electrode 109 which is not covered by the shield electrode 213. Thus, although a black matrix is not always required on the opposite substrate corresponding to the signal line 105 and the scan line, when colors are separated according to pixels of color filters in the black matrix on opposite substrate, the color filters can be easily inspected. Thus, the yield of the production of LCDs can be improved. In addition, with a black matrix where the open aperture portion of the opposite electrode is wider than that of the shield electrode, even if both the positions thereof are moved, the shield electrode can almost define the open aperture portion. According to this embodiment, a black matrix with an open aperture portion 8 μm wider than that of the shield electrode 213 is used. As the results, even if a pattern deviation between the array substrate and the opposite substrate takes place, the area of the opening portion is not changed.

EMBODIMENT 3

Figure 5:
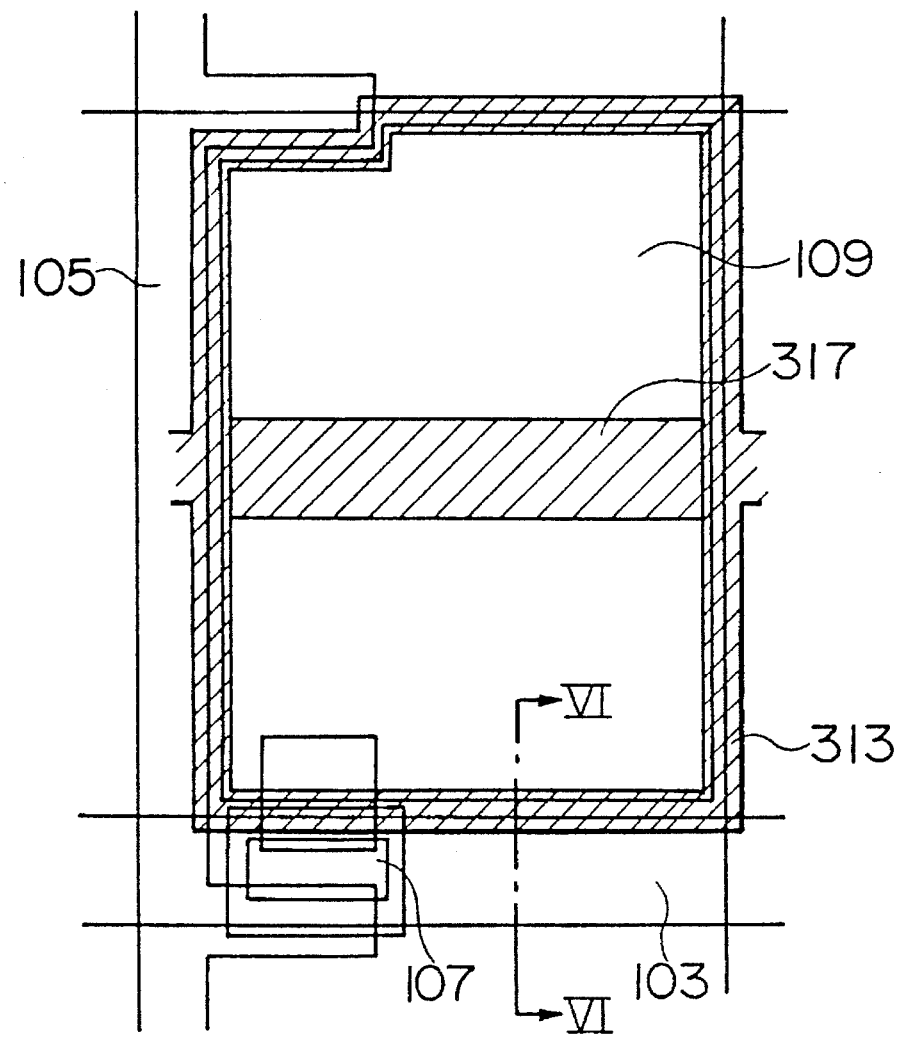
FIG. 5 is a plane view showing the construction of a pixel over an array substrate according to a third embodiment of the present invention.
Figure 6:
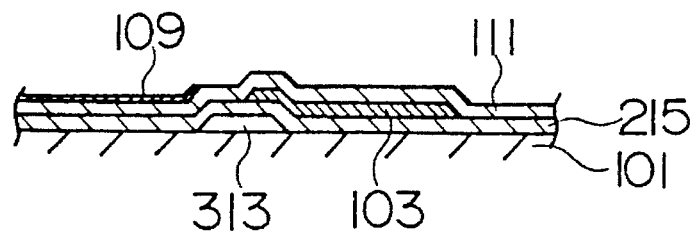
FIG. 6 is a sectional view taken along line VI—VI showing the construction of layers of FIG. 5.

With reference to FIGS. 5 and 6, a third embodiment according to the present invention will be described. For simplicity, in this embodiment, the same portions as the first and second embodiments are denoted by the same reference numerals as FIGS. 1, 2, and so forth, and shield electrode layer is hatched.

An LCD according to the third embodiment is a modification of the LCD according to the second embodiment. A shield electrode 313 is formed so that it is fully overlaid with the periphery of a pixel electrode 109 and overlapped with a scan line 103 and a signal line 105. The shield electrode 313 is used in common with a storage capacitor electrode of a storage capacitor 317 disposed at the center portion of a pixel. The pixel electrode 109 is formed by a self alignment of the shield electrode 313.

A second gate insulation layer 215 and a first gate insulation layer 111 are formed so that the shield electrode 313 is fully overlaid therewith. Between the second and first gate insulation layers 215 and 111, the scan line 103 is formed. At the top, the pixel electrode 109 is formed.

When the pixel electrode 109 is formed, after an ITO film is deposited, a negative resist or an image reverse resist is exposed from the rear surface of a glass substrate 101. The portion overlaid with a source electrode and the portion where the storage capacitor 317 is formed are exposed with a photo mask so as to form the pixel electrode 109. In this case, the distances between the pixel electrode 109 and the signal line 105 and between the pixel electrode 109 and the scan line 103 can be wider than those in the case where the self alignment is performed with only the signal line 105 and the scan line 103. Thus, the parasitic capacitances which are formed between these portions can be more reduced.

When the shield electrode is disposed below the pixel electrode 109, it can be formed on any layer through an insulation layer such as the first gate insulation layer 111.

EMBODIMENT 4

Figure 7:
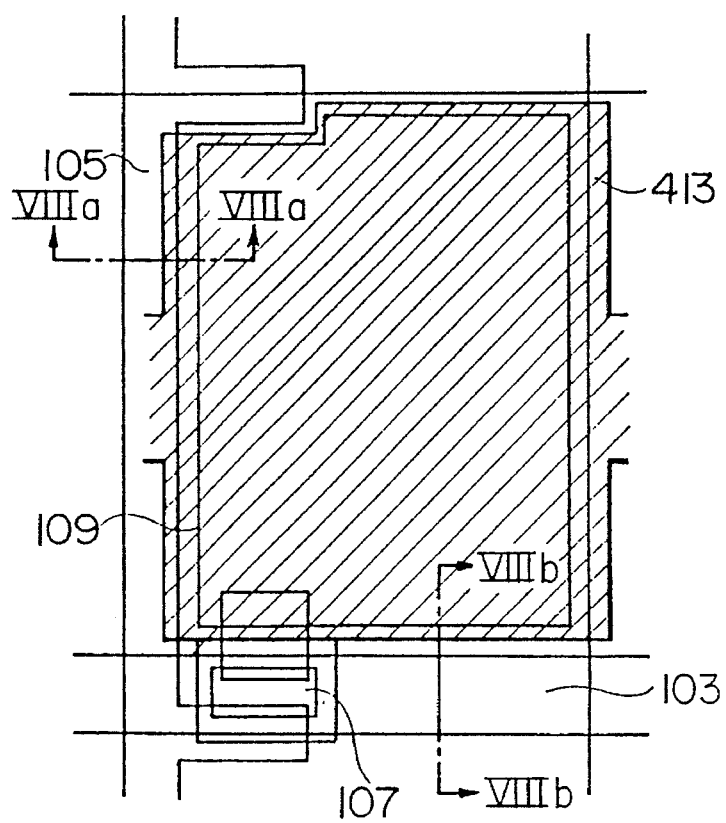
FIG. 7 is a plane view showing the construction of a pixel over an array substrate according to a fourth embodiment of the present invention.
Figure 8A:
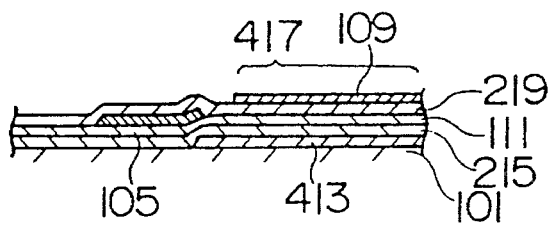
FIG. 8 (a) is a sectional view taken along line VIIIa—VIIIa showing the construction of layers of FIG. 7.
Figure 8B:
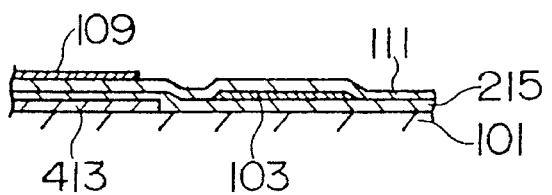

With reference to FIGS. 7, and 8 (a) and (b), a fourth embodiment according to the present invention will be described. For simplicity, in this embodiment, the same portions as the first embodiment are denoted by the same reference numerals as FIG. 1 and so forth, and shield electrode layer is hatched.

An LCD according to the fourth embodiment is a modification of the LCD according to the second embodiment. However, the construction of the LCD according to the fourth embodiment is almost the same as that of the LCD according to the second embodiment.

A shield electrode 413 is formed of a transparent conductive film such as an ITO (Indium—Tin Oxide) film. The shield electrode 413 is opposed to the entire surface of a pixel electrode 109. A storage capacitor 417 is formed using a first gate insulation layer 111 and a second gate insulation layer 215 as a dielectric layer. Thus, the area of the storage capacitor 417 is large.

The capacitance of the storage capacitor 417 depends on the area of the pixel electrode 109 which is overlapped with the shield electrode 413. Thus, according to this embodiment, as shown in FIG. 7, the shield electrode 413 is formed so that the area thereof is larger than that of the pixel electrode 109. However, due to a restriction in performance of TFT such as a drive current characteristic, the area of the shield electrode 413 cannot be always widened. Thus, it is necessary to properly designate the size of the area of the shield electrode 413. For example, when the shield electrode is overlapped with the upper half of the pixel electrode, the capacitance of the storage capacitor can become the half of that of this embodiment.

EMBODIMENT 5

Figure 9:
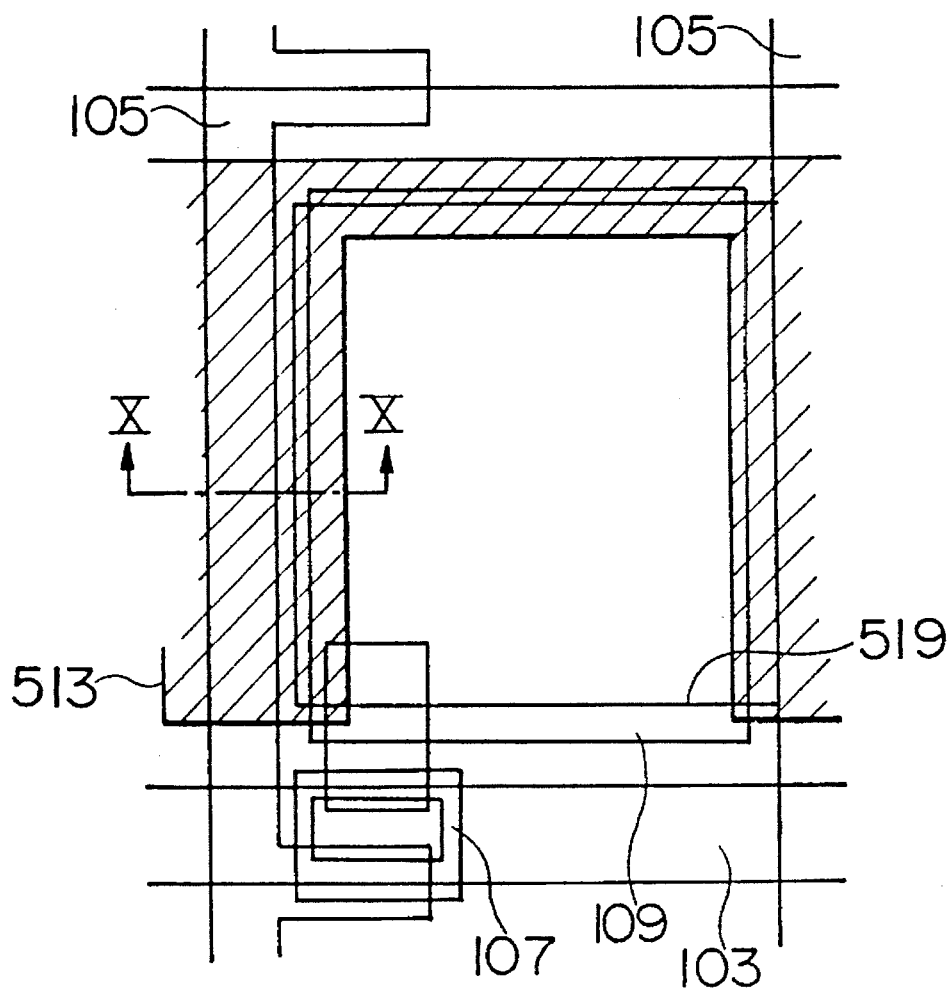
FIG. 9 is a plane view showing the construction of a pixel over an array substrate according to a fifth embodiment of the present invention.
Figure 10:
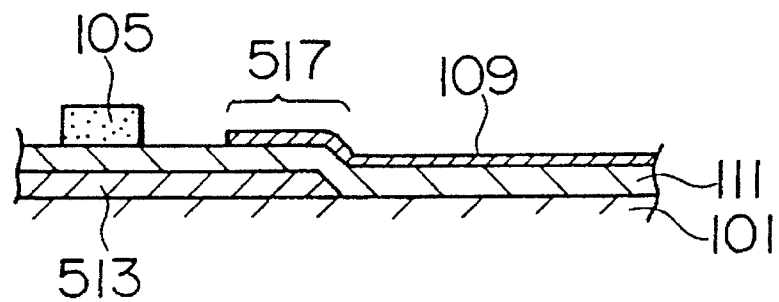
FIG. 10 is a sectional view taken along line X—X showing the construction of layers of FIG. 9.

With reference to FIGS. 9 and 10, a fifth embodiment according to the present invention will be described. For simplicity, in this embodiment, the same portions as the first embodiment are denoted by the same reference numerals as FIG. 1 and so forth, and shield electrode layer is hatched.

An LCD according to the fifth embodiment is a modification of the LCD according to the first embodiment. At a portion where a shield electrode 513 and a pixel electrode 109 are overlapped through a gate insulation layer 111, a storage capacitor 517 is formed. In addition, the shield electrode 513 is overlapped with a signal line 105 for the length equivalent to a pixel. With the shield electrode 513 in this construction, the electrostatic shielding in the vicinity of the signal line 105 can be more effectively performed than that of the first embodiment. Thus, the parasitic capacitances $C_{ds1}$ and $C_{ds2}$ can be more effectively reduced.

When the shield electrode 513 is disposed so that it is overlapped with the signal line 105 for the length equivalent to the pixel, even if the width of the signal line 105 is narrowed, the width of the shield electrode 513 has an allowance. Thus, since a pattern deviation does not take place, the LCD can be easily produced. In addition, a region 519 of an open aperture area of a black matrix formed on an opposite substrate can be widened.

EMBODIMENT 6

Figure 11:
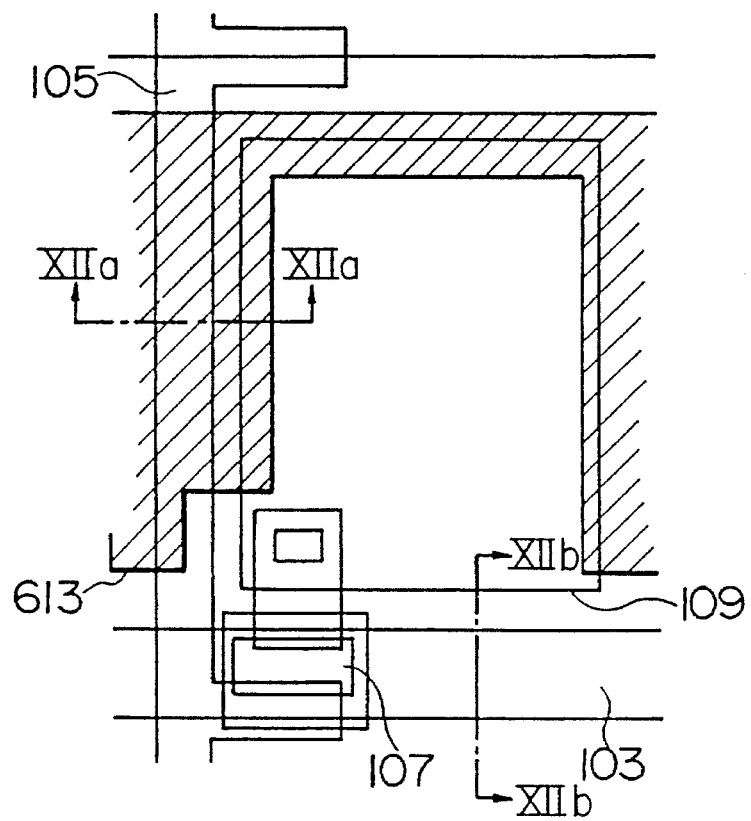
FIG. 11 is a plane view showing the construction of a pixel over an array substrate according to a sixth embodiment of the present invention.
Figure 12A:
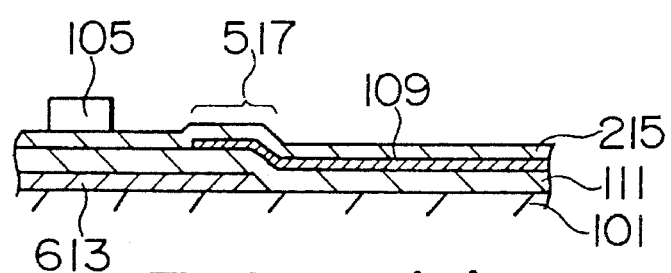
FIG. 12 (a) is a sectional view taken along line XIIa—XIIa showing the construction of layers of FIG. 11.
Figure 12B:
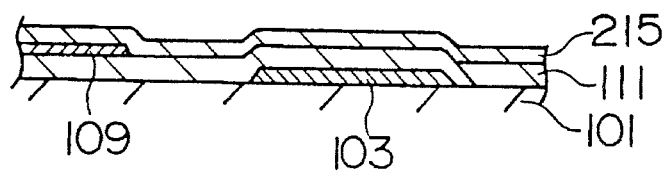

With reference to FIGS. 11 and 12 (a) and (b), a sixth embodiment according to the present invention will be described. For simplicity, in this embodiment, the same portions as the first and fifth embodiments are denoted by the same reference numerals as FIGS. 1, 2, 9, 10, and so forth, and shield electrode layer is hatched.

An LCD according to the sixth embodiment is a modification of the LCD according to the fifth embodiment. A pixel electrode 109 is formed in a gate insulation layer 111. A signal line 105 is disposed over the gate insulation layer 111, thereby securely preventing the pixel electrode 109 and the signal line 105 from shortcircuiting. A shield electrode 613 is disposed below the pixel electrode 109 through the gate insulation layer 111.

Thus, besides the electrostatic shielding effect and the light shielding effect by the shield electrode 613, the pixel electrode 109 and the signal line 105 can be closely disposed without a shortcircuit. As a result, the open aperture ratio of the pixel electrode 109 can be further improved.

Next, a method of producing the LCD according to the sixth embodiment will be described.

A Mo—Ta alloy is deposited over a glass substrate 101 for 250 nm. The Mo—Ta alloy is patterned so as to form a scan line 103 and a shield electrode 613 at the same time. A $SiO_x$ layer as a gate insulation layer 111 is deposited for 200 nm. It is preferred to deposit the $SiO_x$ film twice for 100 nm each so as to prevent a pixel electrode 109 and the shield electrode 613 from shortcircuiting due to pin hole defects or the like.

An ITO film is deposited for 100 nm. The ITO film is patterned so as to form a pixel electrode 109. An $SiO_x$ layer and a $SiN_x$ layer as the gate insulation layer 111 are deposited over the pixel electrode 109 for 100 nm and 50 nm, respectively. With the $SiO_x$ layer of 200 nm, the $SiO_x$ layer of 100 nm, and the $SiN_x$ layer of 50 nm, the gate insulation layer 111 is formed. Inside the gate insulation layer 111, the pixel electrode 109 is disposed.

An activation layer a—Si and a channel protection layer $SiN_x$ are deposited over the gate insulation layer 111 for 50 nm and 200 nm, respectively. The channel protection layer $SiN_x$ is etched in a land shape. A $n^+a$—Si layer as an ohmic contact layer is deposited for 50 nm. It is known that when a $SiN_x$ layer is deposited on the ITO layer by plasma CVD method, defects such as film peeling and surface whitening take place on the substrate. When the deposition conditions are properly selected, the $SiN_x$ layer can be deposited without an occurrence of such defects. However, experimental results show that the SiN$_x$ layer used for the gate insulation layer adversely affects the characteristics of the TFT. Thus, in this embodiment, a SiO$_x$ film is deposited on the ITO layer.

The n$^+$a—Si layer and the a—Si layer are etched in a land shape. Contact holes are provided at the lead portion of the scan line 103 and the gate insulation layer 111 which is electrically connected to the pixel electrode 109 with BFH (Buffered Hydrogen Fluoride acide).

A Cr layer and an Al layer are deposited for 50 nm and 300 nm, respectively. These layers are patterned so as to form a signal line 105, a drain electrode, and a source electrode.

With a mask of the signal line 105, the n$^+$a—Si layer disposed between the source and drain electrodes of the TFT 107 is selectively etched while the channel protection layer is left. Thus, a TFT array substrate is formed.

Since the TFT is overlaid with the SiN$_x$ layer, the reliability of the TFT is improved. Thus, after the SiN$_x$ layer is deposited over the TFT 107 for 200 nm, the SiN$_x$ layer at each electrode lead portion and over the pixel electrode 109 is etched and removed. When the SiO$_x$ layer on the pixel electrode 109 is also etched and removed, the picture display quality of the LCD is further improved. However, when the SiO$_x$ layer is kept over the pixel electrode 109, even if a conductive foreign material enters liquid crystal material, the SiO$_x$ layer can prevent the pixel electrode 109 and the opposite electrode from shortcircuiting.

The TFT array substrate and the opposite substrate are fitted and the periphery thereof is sealed with a sealing agent. Between these substrates, a liquid crystal material is injected. Thus, this LCD is completed.

According to this embodiment, the SiO$_x$ layer was deposited by the plasma CVD method. However, the thermal CVD method is more preferable.

The thickness of the SiO$_x$ film used for a dielectric of the storage capacitor 517 is 200 nm which is smaller than 300 nm of the fifth embodiment. However, shortcircuits and current leakage which took place between the shield electrode 613 and the pixel electrode 105 was half that of the fifth embodiment. Experimental results where the fifth embodiment and the sixth embodiment were compared show that such a situation took place due to the following reasons.

Since the channel protection layer was selectively etched in a land shape, while the a—Si layer was left, the etching were theoretically stopped on the a—Si layer. However, actually, the etching solution entered the gate insulation layer 111 through defective portions of a—Si layer such as pin holes. Thus, holes were made on the gate insulation layer 111. When the ITO layer was deposited, it was deposited in these holes, resulting in a shortcircuit defect. However, according to the LCD of the sixth embodiment, the pixel electrode 109 composed of the ITO layer was formed before the etching step of the channel protection layer had been performed. In addition, the ITO film which is annealed at a temperature of 200° C. or over has a very high resistance to the etching solution used for the etching of the channel protection layer. Thus, unless the pin holes on the ITO film are just matched with those on the a—Si layer, such shortcircuit defects hardly take place. Thus, according to the sixth embodiment, it is supposed that the shortcircuit defects which took place between the shield electrode 613 and the pixel electrode 105 were half those of the fifth embodiment.

EMBODIMENT 7

Figure 13:
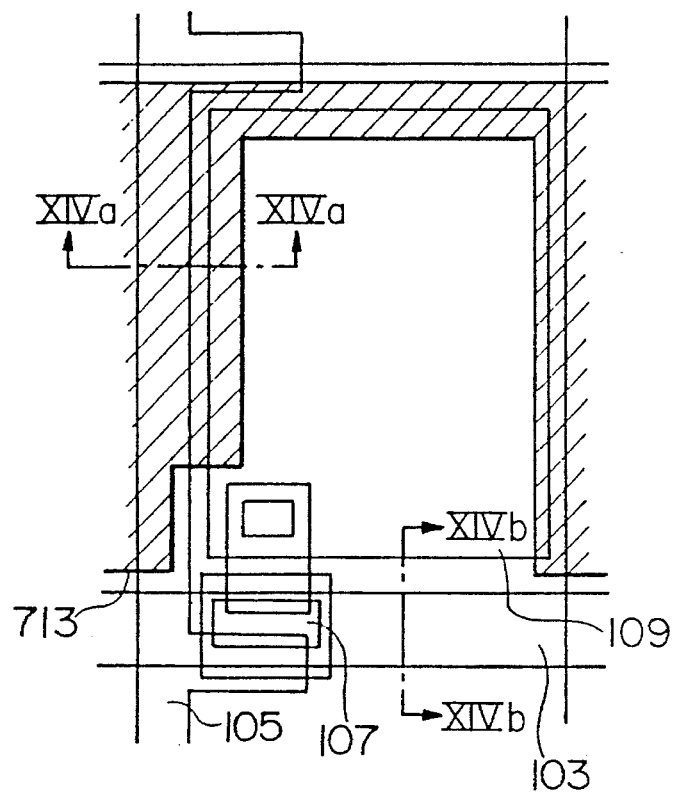
FIG. 13 is a plane view showing the construction of a pixel over an array substrate according to a seventh embodiment of the present invention.
Figure 14A:
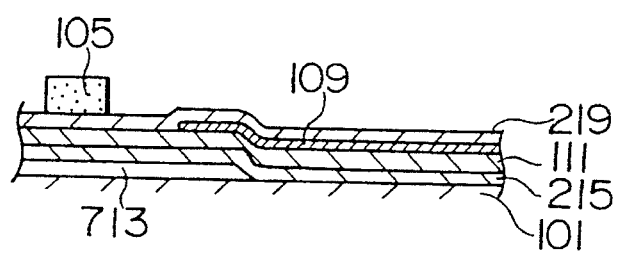
FIG. 14 (a) is a sectional view taken along line XIVa—XIVa showing the construction of layers of FIG. 13.
Figure 14B:
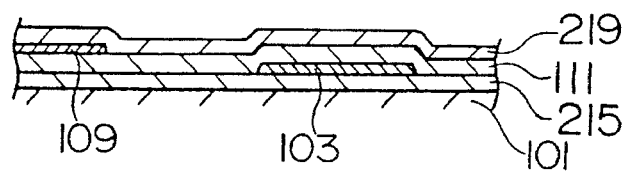

With reference to FIGS. 13 and 14 (a) and (b), a seventh embodiment according to the present invention will be described. For simplicity, in this embodiment, the same portions as the first and sixth embodiments are denoted by the same reference number as FIGS. 1, 2, 11, 12, and so forth, and shield electrode layer is hatched.

An LCD according to the seventh embodiment is a modification of the LCD according to the sixth embodiment. A shield electrode 713, a scan line 103, and a pixel electrode 109 are separately disposed through a first gate insulation layer 111, a second gate insulation layer 219, and an insulation layer 215 so as to securely prevent them from shortcircuiting and allow the pattern of the shield electrode 713 to be freely designed. Thus, since the open aperture ratio of the pixel electrode can be widened, the brightness of the display is improved. In addition, since the shield electrode 713 is overlapped with the signal line 105 for the length equivalent to a pixel, the electrostatic shielding effect is improved.

When a delay of scanning pulses and a voltage fluctuation of the scan line 103 do not take place, the shield electrode 713 can be overlapped with the scan line 103.

EMBODIMENT 8

Figure 15:
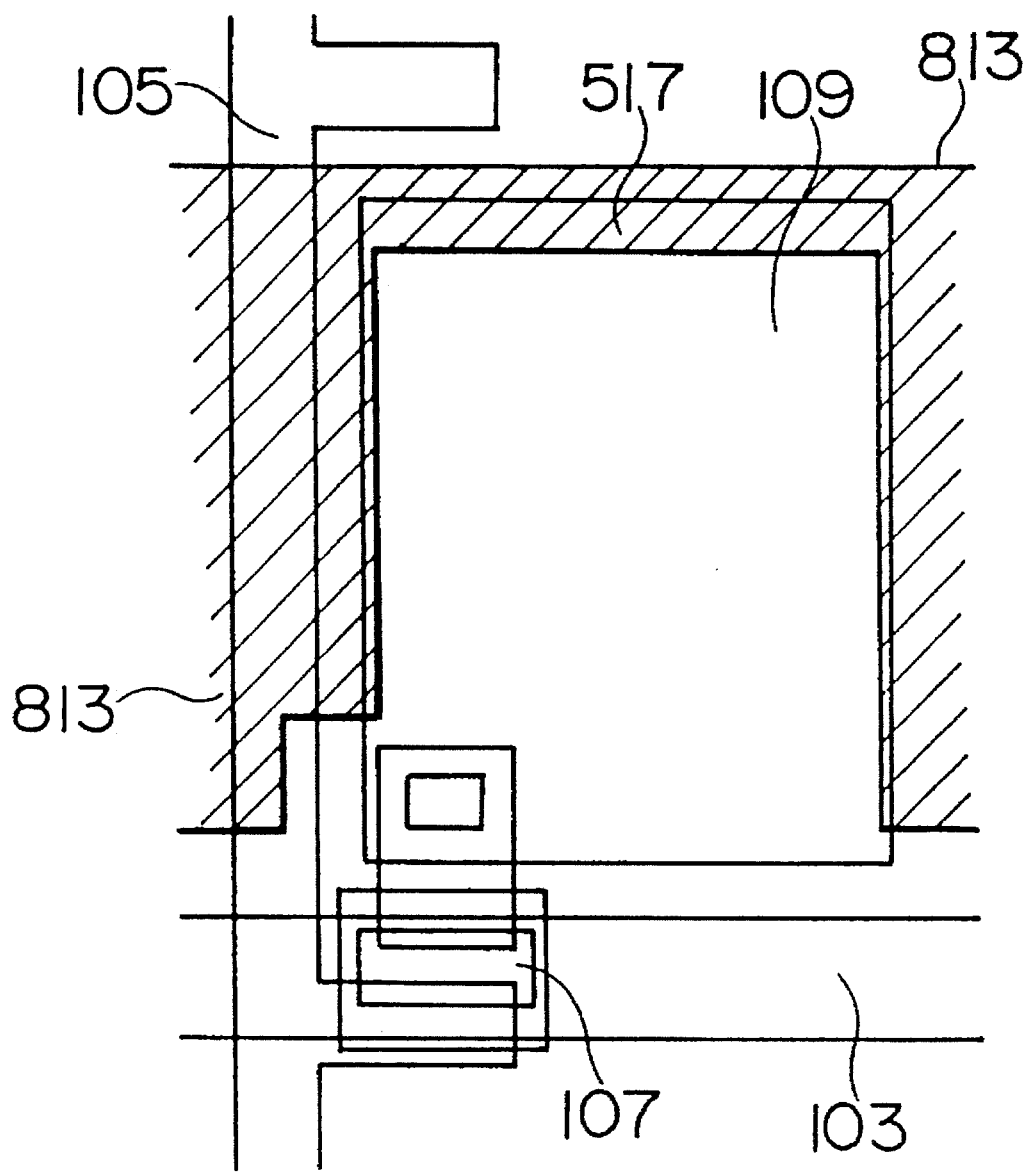
FIG. 15 is a plane view showing the construction of a pixel over an array substrate according to a seventh embodiment of the present invention.
Figure 16A:
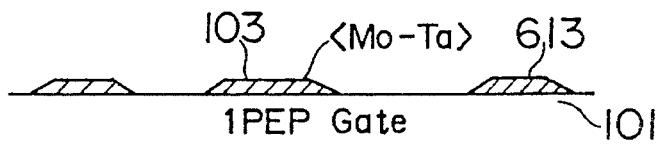
FIGS. 16 (a) to (g) are sectional views showing a patterning process of an array substrate according to a ninth embodiment of the present invention.
Figure 16B:
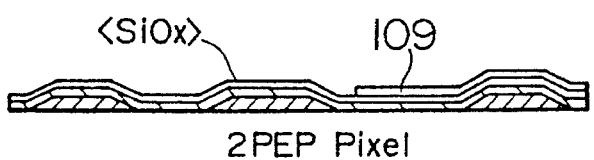
Figure 16C:
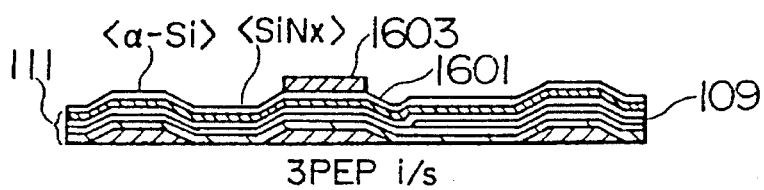
Figure 16D:
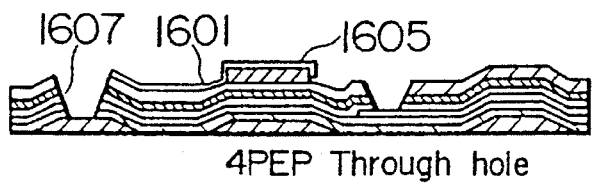
Figure 16E:
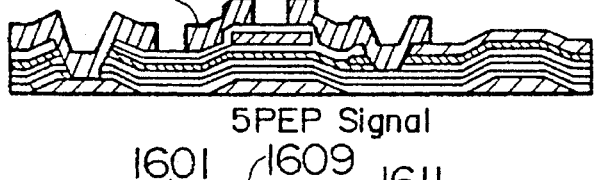
Figure 16F:
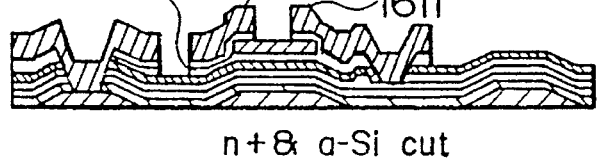
Figure 16G:
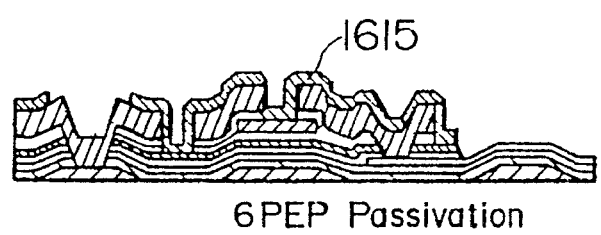
Figure 18:
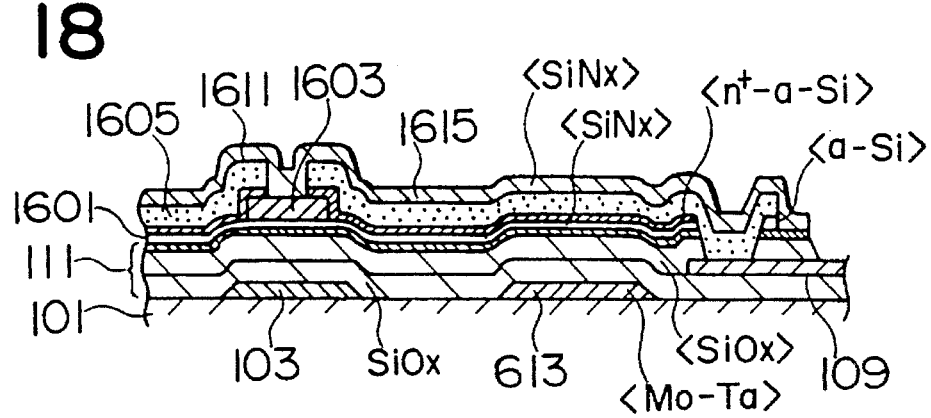
FIG. 18 is a sectional view showing the construction of a first modification of the array substrate according to the ninth embodiment.
Figure 19:
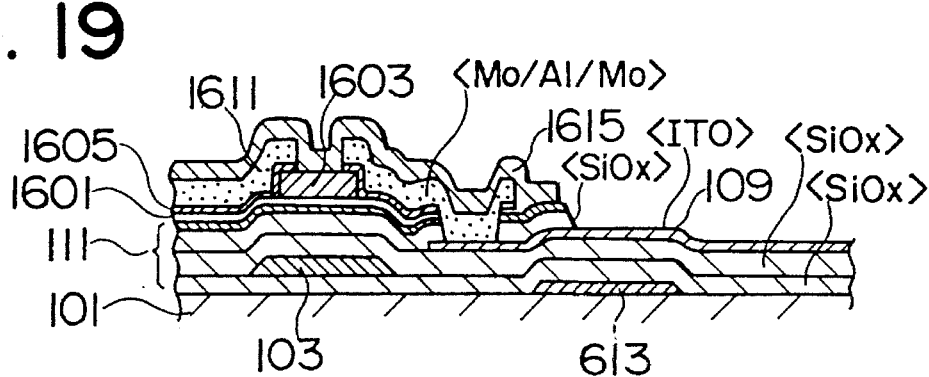
FIG. 19 is a sectional view showing the construction of a second modification of the array substrate according to the ninth embodiment.
Figure 20:
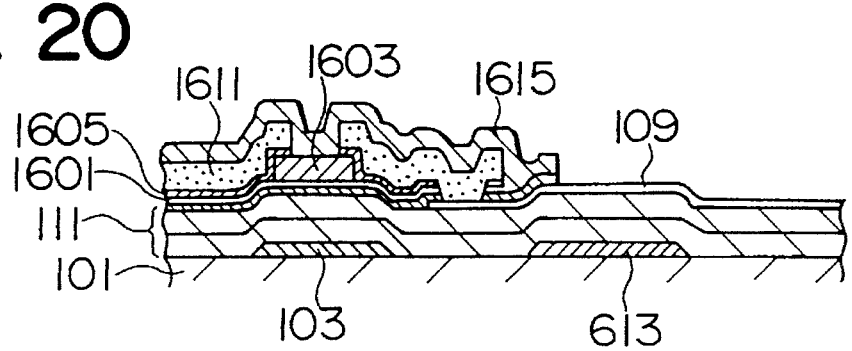
FIG. 20 is a sectional view showing the construction of a third modification of the array substrate according to the ninth embodiment.

With reference to FIG. 15, an eighth embodiment according to the present invention will be described. An LCD according to the eighth embodiment is a modification of the method of producing the LCD according to the seventh embodiment. According to the eighth embodiment, a pixel electrode 109 is formed by a self alignment of a shield electrode 813.

An ITO film is deposited. With an image reverse resist, an unnecessary portion of the ITO film which is not overlapped with a shield electrode 813 is exposed with a mask and developed. Thus, a pixel electrode 109 is formed.

After an exposure from the rear surface and a mask exposure are performed, an image reverse baking is performed. A pattern is formed with a full surface exposure. This production method is suitable for an LCD where the shield electrode 813 and the scan line 103 are not overlapped. In addition, this method can be used when the pixel electrode 109 composed of the ITO film is formed before the signal line 105 is formed. Moreover, most of the storage capacitor 517 can be formed by the last mask exposure.

EMBODIMENT 9

With reference to FIG. 16, a ninth embodiment according to the present invention will be described. For simplicity, in this embodiment, the same portions as the first and sixth embodiments are denoted by the same reference numerals as FIGS. 1, 2, 11, 12, and so forth.

As described above, the LCD according to the sixth embodiment was produced with seven patterning steps including a patterning step of a passivation layer. However, experimental results show that the LCD in this construction can be produced with an omission of the step for leaving the a—Si layer in a land shape. Now, with reference to FIG. 16 (a) to (g), a method of producing an LCD with six patterning steps will be described.

A Mo—Ta alloy is deposited over a glass substrate 101 for 250 nm. The Mo—Ta alloy is patterned so as to form a scan line 103 and a shield electrode 613 at the same time (See FIG. 16 (a)).

A $SiO_x$ layer as a gate insulation layer 111 is deposited twice for 130 nm each. An ITO film is deposited and patterned so as to form a pixel electrode 109 (See FIG. 16 (*b*)).

A $SiO_x$ layer and a $SiN_x$ layer which are a gate insulation layer 111 are deposited on the pixel electrode 109 for 90 nm and 50 nm, respectively. Thus, the pixel electrode 109 is disposed in the gate insulation layer 111. An a—Si layer as an activation layer 1601 and a $SiN_x$ layer as a channel protection layer 1603 are deposited over the gate insulation layer 111 for 50 nm and 200 nm, respectively. The $SiN_x$ layer is etched in a land shape (See FIG. 16 (*c*)).

An $n^+$a—Si layer as an ohmic contact layer 1605 is deposited for 50 nm. A through-hole 1607 is formed at each lead portion of the pixel electrode 109 and the scan line 103. The layers from the top $n^+$a—Si layer to the SiOx film of the gate insulation layer 111 are successively etched so as to make the through-hole 1607 (See FIG. 16 (*d*)).

A Mo/Al/Mo layer is deposited and patterned so as to form a signal line 105, a drain electrode 1609, and a source electrode 1611 (See FIG. 16 (*e*)).

With a mask of the signal line 105 and so forth, the $n^+$a—Si layer disposed between the source electrode 1611 and the drain electrode 1609 of the TFT 107 is selectively etched while the channel protection layer 1603 is left. The a—Si layer over the pixel electrode 109 is etched and removed so as to form a TFT array (See FIG. 16 (*f*)).

A $SiN_x$ layer as a protection layer 1615 is deposited over the TFT 107 for 200 nm. The $SiN_x$ layer at each electrode lead portion and over the pixel electrode 109 are etched and removed. At the same time, the $SiO_x$ layer on the pixel electrode 109 is etched and removed (See FIG. 16 (*g*)).

As described above, since the LCD can be produced with the above-described six patterning steps, the productivity is more improved than that of the sixth embodiment. Conventionally, when a land-shaped semiconductor film is patterned, an incorrect pattern is sometimes formed. Thus, a TFT operation failure takes place and thereby the yield of production is low. However, experimental results show that according to the ninth embodiment, the yield of production can be improved without an occurrence of such a defect.

Next, with reference to FIG. 17 (*a*) to (*e*), a process for forming the above-mentioned through-hole 1607 will be described.

The ohmic contact layer 1605 composed of $n^+$a—Si, the activation layer 1601 composed of a—Si, the gate insulation layer composed of $SiN_x$ are partially etched and patterned by CDE (Chemical Dry Etching) method using a gas mainly composed of $CF_4$ and a resist 1613 (See FIG. 17 (*a*)).

The $SiO_x$ film of the gate insulation layer 111 is etched with BHF so as to form a through-hole 1607 and so forth. The lead portion of the scan line 103 and so forth composed of Mo —Ta and so forth is exposed (See FIG. 17 (*b*)).

The $n^+$a—Si film, the a—Si film, and the $SiN_x$ film which are the ohmic contact layer 1605, the activation layer, and so forth are protruded in an overhang shape from the wall surface of the through-hole 1607 (See FIG. 17 (*c*)).

The protruded portion of the $n^+$a—Si film, the a—Si film, and the $SiN_x$ film are etched and removed by the CED process using a gas mainly composed of $CF_4$ so that the through-hole 1607 is satisfactorily retreated from the wall surface of $SiO_x$. The through-hole 1607 is preferably retreated by around 0.1 to 3 μm. A native oxide and so forth over the surface of the Mo—Ta layer exposed are lightly etched and removed (See FIG. 17 (*d*)).

Thus, the electric contact through the through-hole 1607 between Mo—Ta alloy and the Mo/Al/Mo film which is next deposited is improved (See FIG. 17 (*e*)).

Although the protruded portions in the overhang shape are removed from the through-hole 1607, there is a shoulder portion and a material cannot be well disposed thereon. When the shoulder portion is etched with an etching solution, a mouth hole is formed. In other words, the shoulder is broken. Thus, according to this embodiment, it is preferred to widen the width of a wiring pattern composed of the Mo/Al/Mo film which is deposited over the pattern of the through-hole 1607.

It should be noted that the forming steps of the through-hole are not limited to those described above. Rather, for example, reactive ion etching (RIE) method can be used so as to prevent the $SiO_x$ layer from being undercut. However, in this case, when the $SiO_x$ layer is etched to the lower Mo—Ta layer selectively. In this condition, since the etching rate of the $SiO_x$ layer is at most 500 angstroms/minute, the productivity of the RIE method is low. In addition, when a resist is applied over the $n^+$a—Si layer, the surface may be dirtied, thereby deteriorating the characteristics of the TFT 107. Thus, it is preferred to deposit a Mo layer for around 500 angstroms over the $n^+$a—Si layer and etch the Mo layer after the through-hole is formed. Moreover, when an LCD according to another embodiment of the present invention is produced, it is possible to omit the patterning step of the a —Si film. Furthermore, the shield electrode is not always required to produce an LCD according to the present invention. For example, this construction of layers can be applied to various constructions as shown in FIGS. 18 to 22.

Figure 21:
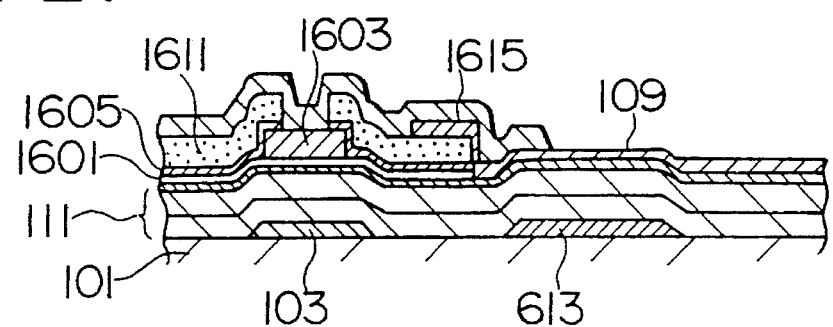
FIG. 21 is a sectional view showing the construction of a fourth modification of the array substrate according to the ninth embodiment.
Figure 22:
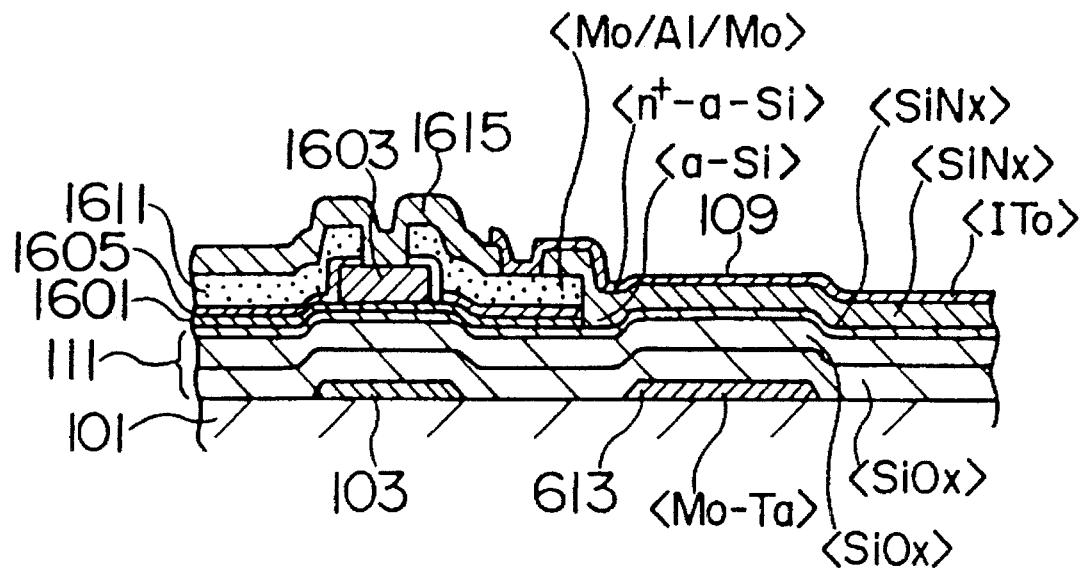
FIG. 22 is a sectional view showing the construction of a fifth modification of the array substrate according to the ninth embodiment.

In the constructions shown in FIGS. 21 and 22, it is not necessary to form a through-hole on a pixel electrode 109. However, for a lead portion of a scan line 103, it is preferred to use the above-mentioned process. In the construction shown in FIG. 22, a passivation layer 1615 over a shield electrode 613 can be etched and removed so as to increase the capacitance of a storage capacitance.

In the construction shown in FIG. 22, both a through-hole which connects a source electrode 1611 to a pixel electrode 109 and a lead portion of a scan line 103 can be formed with the same step. Thus, with five patterning steps, a TFT array can be formed. Thus, the productivity is further improved. In this case, layers from the $SiN_x$ film of the passivation layer 1615 to the $SiN_x$ film of the gate insulation layer 111 are etched by the RIE method. After the $SiO_x$ film is etched with BHF, the above-mentioned CDE process is performed. Thus, a through-hole without a protrusion in an overhang shape can be formed.

In the construction shown in FIG. 22, a pixel electrode 109 is formed over a passivation layer 1615. Thus, the total thickness of the insulation film used as a dielectric of a storage capacitor can be increased. As a result, when the shield electrode 613 and the pixel electrode 109 should be largely overlapped and the storage capacitance should be reduced, this construction is especially useful.

EMBODIMENT 10

Figure 23A:
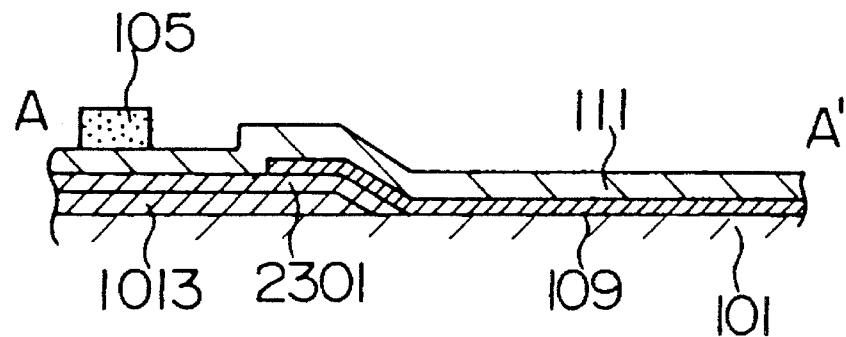
FIG. 23 (a) is a sectional view showing the construction of layers on a signal line side of an array substrate according to a tenth embodiment of the present invention.
Figure 23B:
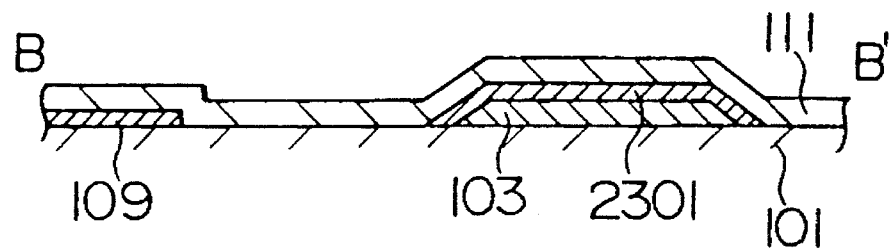

With reference to FIG. 23, a tenth embodiment according to the present invention will be described. For simplicity, in this embodiment, the same portions as the above-mentioned embodiments are denoted by the same reference numerals as corresponding figures.

According to the LCD shown in FIG. 11, with an insulation layer such as a gate insulation layer, shortcircuits of a shield electrode, a signal line, a scan line, and so forth are prevented. However, when the number of insulation layers increases, the number of film forming steps correspondingly increases. Thus, the production cost of the resultant LCD rises. This is because expensive equipment such as plasma CVD equipment and extra gas and film materials should be used.

Since the insulation film should be formed at low cost, it is preferred to use an anode-oxidizing method for oxidizing the surface of the shield electrode. With the anode-oxidizing method, since pin holes do not take place, shortcircuits between each layer can be prevented.

An Al thin film is deposited over a glass substrate 101 so as to form a shield electrode 1013 and a scan line 103. The surface of the film is oxidized with boric acid by constant-current oxidizing method up to voltages of 100 V. Thereafter, the constant-current oxidization is performed for 30 minutes so as to form an $Al_2O_3$ layer 2301.

An ITO film is sputtered and patterned so as to form a pixel electrode 109.

A $SiO_x$ film or a lamination of a $SiO_x$ film and a $SiN_x$ film is deposited so as to form a gate insulation film 111. An a—Si film is deposited over the gate insulation film. The $SiN_x$ film is patterned so as to form a channel protection layer 1603. After an $n^+a$—Si film is deposited, the a—Si film is patterned in a land shape so as to form an activation layer 1601.

An Al/Mo layer is sputtered and deposited so as to form a source electrode 1611 and a drain electrode 1609. A passivation layer composed of an $SiN_x$ film is deposited over the source electrode 1611 and the drain electrode 1609. The $SiN_x$ layer over the pixel electrode 109 and at lead portions is etched and removed.

Besides Al, the shield electrode 1013, the scan line 103, and so forth can be formed of a laminate material such as Ta, $TaN_x$, Ti, Nb, $TiN_x$, or $TaN_x/Ta/TaN_y$.

Figure 24A:
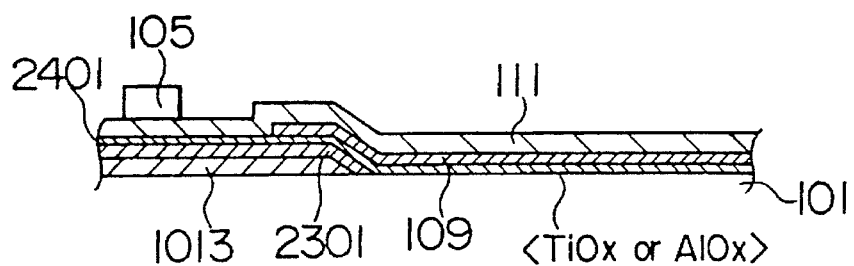
FIG. 24 (a) is a sectional view showing the construction of a first modification on the signal line side of the array substrate according to the tenth embodiment.
Figure 24B:
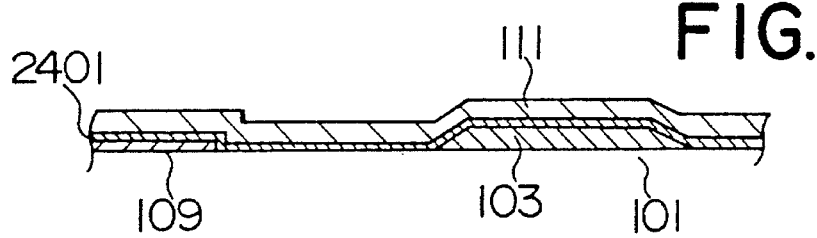

When an ITO film is deposited over an anode oxidized film of Ta or $TaN_x$ and then an a—Si film is deposited thereon by the plasma CVD method, In and Sn diffuse in the anode oxidized film, thereby increasing the amount of a leak current. To prevent this, as shown in FIG. 24, with a material such as $SiO_x$, $SiN_x$, $TiO_x$, or $AlO_x$ whose ion diameter is smaller than that of In and Sn, a thin film 2401 with a thickness of 1000 angstroms, more preferably 200 to 500 angstroms is formed between a Ta type anode oxidized film and an ITO film. Thus, since the diffusion of In and Sn into the anode oxidized film can be prevented, the amount of leak current does not increase.

In addition, an alloy where Si is mixed with Ta or $TaN_x$ can be used. Moreover, a wiring lead formed of a lamination of $TaSiN_x/Ta/TaN_x$ can be anode-oxidized.

When the gate insulation film 111 is sputtered, a leak current can be effectively suppressed.

In this construction and using this production method, the number of plasma CVD film forming steps which are expensive can be reduced, thereby lowering the production cost.

Moreover, the relative permittivities of $Al_2O_3$, $TaO_x$, $TaN_xO_y$, $TiO_x$, Ta—Si—O, and Ta—Si—N—O are 7, 30, 20, 85, 20, and about 15, respectively. On the other hand, the relative permittivity of $SiO_x$ is 4. Thus, the capacitance of the storage capacitor with an electrode used for the shield electrode 1013 can be increased with a small area.

When films being formed by the plasma CVD method are exposed to dust, pin hole defects often occur. Thus, short-circuit defects take place. To prevent such defects, these films should have a proper thickness. On the other hand, the thickness of the gate insulation layer used for the TFT 107 is the total of the thickness of the upper, middle and lower insulation layers of the pixel electrode 109 composed of ITO. When the thickness of the gate insulation layer is too large and thereby the capacitance is small, the amount of on current adversely decreases. Thus, it is preferred that the thin film 2401 and so forth are formed of materials having a high relative permittivity.

On the other hand, when the signal line 105 and the pixel electrode 109 which are overlapped have a pattern failure, the pixel may have a display defect due to a coupling capacitor formed therebetween. To suppress this defect, it is necessary to decrease the coupling capacitance. Thus, when an insulation film composed of $SiO_x$ or the like with a relative permittivity lower than that of a liquid crystal material is disposed between the signal line 105 and the pixel electrode 109, the coupling capacitance can be reduced. Thus, it is preferred to use an anode oxidized film for the first insulation layer.

EMBODIMENT 11

When a pixel voltage shift ($\Delta V_p$) varies on a display pixel by pixel, it is impossible to set an opposite electrode voltage with a proper offset to all the pixels of the display. Thus, display picture defects such as flickering, smearing, and image sticking take place, thereby remarkably degrading the picture display quality.

Figure 25:
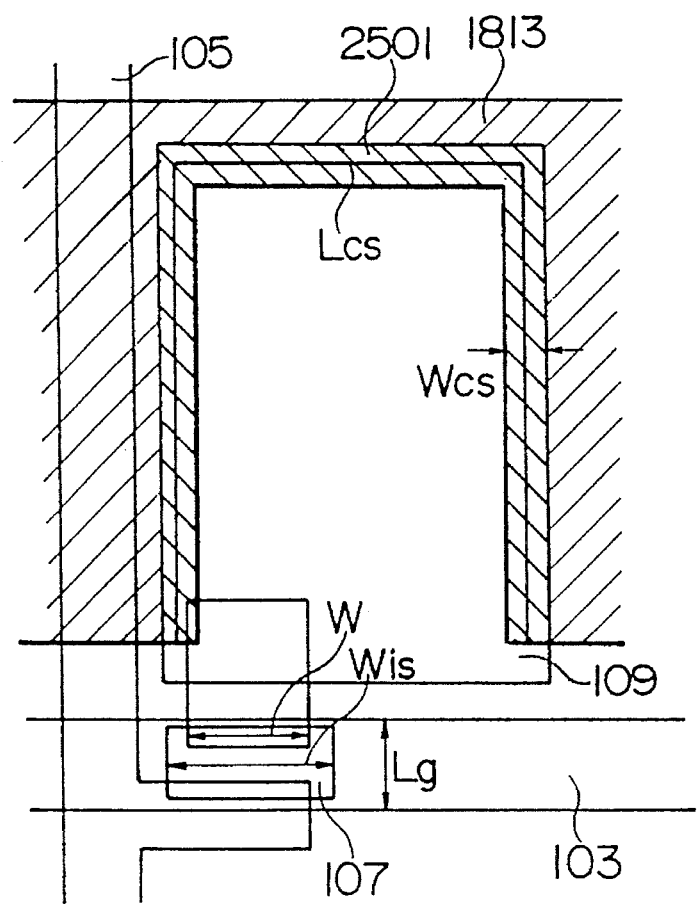
FIG. 25 is a plane view for explaining a pixel voltage shift with mathematical equations.

Thus, countermeasures for suppressing such a pixel voltage shift ($\Delta V_p$) are required. Next, with reference to FIG. 25 which shows an eleventh embodiment according to the present invention, such countermeasures will be described.

When a storage capacitor is formed by a shield electrode and a pixel electrode which are overlapped each other, the width where the shield electrode and the pixel electrode are overlapped, $W_{cs}$, is the width of the storage capacitor 2501. Experiments conducted by the inventors of the prevent invention confirmed that when the overlap width $W_{cs}$ which forms the storage capacitor 2501 is properly set, the width of distribution of the pixel voltage shift $\Delta V_p$ on the display is narrowed.

A required TFT size W depends on $C_{s0}$ and $C_{1c-max}$. When the overlap width $W_{cs}$ which forms the storage capacitor 2501 varies, the capacitance $C_s$ of the capacitor varies. Thus, the TFT size W should be accordingly changed. However, when the variation of the pixel voltage shift, $\Delta V_p$, due to the variations of $W_{cs}$ W is considered, there is an optimum value. This is because the deviation of the width of the scan line is offset with the deviation of the width of the shield line which is an electrode of the storage capacitor. When the $W_{cs}$ is set to this optimum value, the pixel voltage shift $\Delta V_p$ can be minimized.

Figure 26:
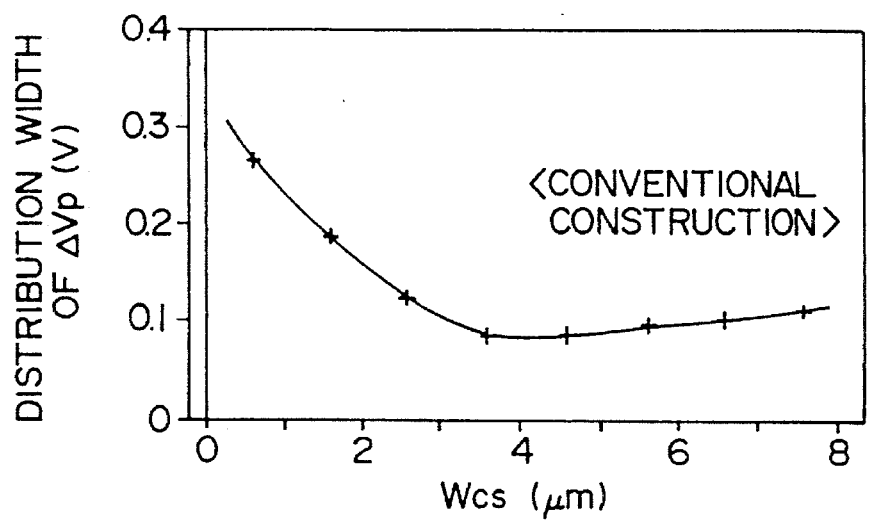
FIG. 26 is a graph showing a correlation between a deviation of pixel voltage shift $\Delta V_p$ and a width $W_{cs}$ of a storage capacitance.

Several types of TFT-LCDs with different values of $W_{cs}$ and W were produced and their pixel voltage shifts $\Delta V_p$ were measures. The width of the gate electrode, $L_g$, was 13 μm. The TFT 107 used was of a self alignment type where a channel protection layer was formed over a gate electrode by self alignment. In the experiments, the gate and shield electrode had a distribution of line width of around 1 μm. FIG. 26 shows the distribution of experimental results where the difference between the maximum and minimum values of the pixel voltage shifts $\Delta V_p$ on the entire display is a distribution width. In the conventional LCD, the distribution width is around 0.13 V.

Next, with mathematical equations, a method for obtaining an optimum value of $W_{cs}$ will be described. First, the pixel voltage shift $\Delta V_p$ is given by the following equation.

$$\Delta V_p = (V_g \cdot C_{gs}) / (C_s + \beta \cdot C_{1c-max})$$

since $$C_{gs} = L_g \cdot W_{is} \cdot C_{gi} / 2$$

$$C_s = L_{cs} \cdot W_{cs} \cdot C_{si}$$

$$\alpha = (C_{so} + C_{1c-max}) / W_0$$

$$W = (W_{cs} \cdot L_{cs} \cdot C_{si} + C_{1c-max}) / \alpha$$

where

- $L_g$ is the width of the gate electrode;
- $W_{is}$ is the length of the channel protection layer;
- $L_{cs}$ is the length of the center line of the portion where the pixel electrode and the shield electrode which forms a storage capacitor is overlapped;
- $W_{cs}$ is the width of the storage capacitor (=area of storage capacitor / $L_{cs}$);
- $C_{gi}$ is the capacitance of the gate insulation layer per unit area;
- $C_{si}$ is the capacitance of the storage capacitor per unit area;
- $C_{so}$ is the capacitance of the designed storage capacitor (designed capacitance);
- $C_s$ is the capacitance of the storage capacitor (real capacitance);
- $C_{1c-max}$ is the maximum capacitance of one pixel of the LCD;
- $C_{1c-min}$ is the minimum capacitance of one pixel of the LCD;
- $C_{gs}$ is the parasitic capacitance between the gate (scan line) and the source (pixel electrode);
- $W_0$ is the width of the designed TFT (designed width);
- $W$ is the width of the TFT (real value which varies with $C_s$);
- $V_g$ is the voltage applied to the scan line; and
- $\beta$ is a constant (where $\beta = (C_{1c-max} + C_{1c-min})/2C_{1c-max}$)
- $W_{is} = W + 5$ μm (in this embodiment)

In forming a shield electrode which is used in common with a gate electrode and a scan line or an electrode of a storage capacitor, when a designed pattern width is $X_0$ and a real pattern width is X, the following equations can be obtained.

$$dC_{gs}/dX = (dC_{gs}/dL_g) \times (dL_g/dX)$$
$$= (W_{is} \cdot C_{gi}/2) \times 1$$

$$dC_s/dX = (dC_s/dW_{cs}) \times (dW_{cs}/dX)$$
$$= L_{cs} \cdot C_{si}/2$$

thus, $$(1/V_g) \times (d\Delta V_p/dX) =$$
$$(W_{is} \cdot C_{gi}/4) \times \{2(C_s + \beta \cdot C_{1c-max}) - L_g \cdot L_{cs} \cdot C_{si}\} / (C_s + \beta \cdot C_{1c-max})^2$$

To minimize the variation of the $\Delta V_p$ according to the variation of X, the value of Wcs should be selected so that $d\Delta V_p/dX = 0$. thus, $$W_{cs} = (L_g \cdot L_{cs} \cdot C_{si} - 2\beta \cdot C_{1c-max}) / (2L_{cs} \cdot C_{si}).$$

The construction of the eleventh embodiment is similar to that of the seventh embodiment. The major parameters of the eleventh embodiment are: $L_g$=13 μm, $L_{cs}$=550 μm, $C_{1c-max}/C_{1c-min}$=0.35 pF / 0.14 pF; and $C_{si}$=1.8×10$^{-4}$ pF / μm$^2$. When these parameter values are substituted into the above-mentioned resultant equation, the optimum value of the overlap width $W_{cs}$ becomes 4 μm. Visual inspection of the LCD of this embodiment (with $W_{cs}$=4) confirmed that a high picture display quality is obtained.

The width of the storage capacitor, $W_{cs}$, is not limited to the above mentioned optimum value. As shown in FIG. 26, when the optimum value is denoted by $W_{cs}^{opt}$, in the condition of $0.7 W_{cs}^{opt} \leq W_{cs} \leq 2W_{cs}^{op}$, a sufficient result can be obtained.

As shown in FIG. 26, when the value of Wcs is small, since the value of $C_s$ largely varies, $\Delta V_p$ largely fluctuates. However, when the open aperture ratio is considered, it is preferred that the value of $W_{cs}$ is small. Thus, to suppress $\Delta V_p$, it is preferred that the value of Lg is decreased.

Results of experiments conducted by the inventors of the present invention show that when a scan line and a gate electrode are produced in a different step from a production step for a shield electrode according to the seventh embodiment, the fluctuation of $\Delta V_p$ on the display decreases. This is because there is a correlation of the fluctuation between the line width of the scan line and the gate electrode and the line width of the electrode of the storage capacitor. In this embodiment, since each step is performed with the same equipment, patterning conditions of each step become identical. Thus, it is supposed that the fluctuation of the line width offsets the fluctuation of $\Delta V_p$ on the screen.

Figure 27:
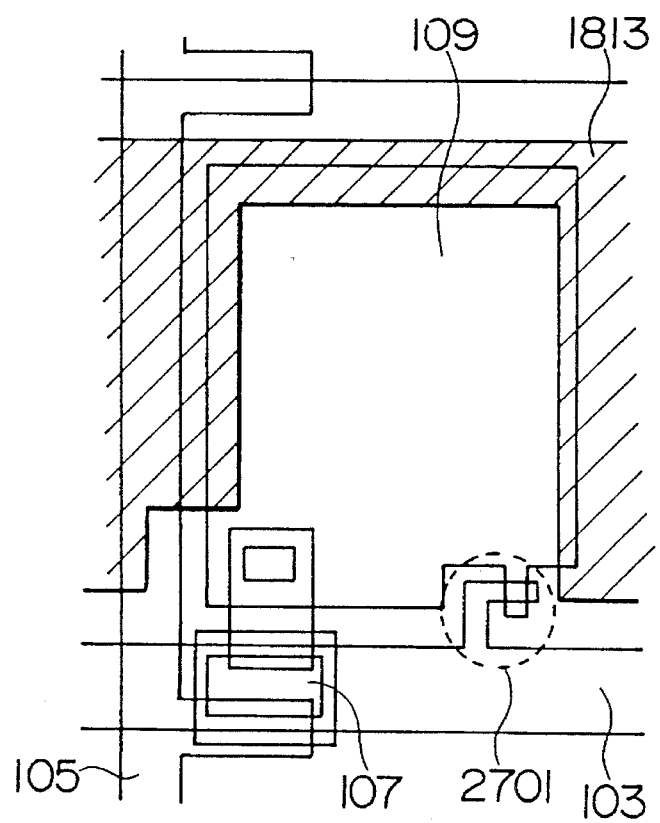
FIG. 27 is a plane view showing the construction of a pixel on an array substrate having a compensation portion 2701.
Figure 28:
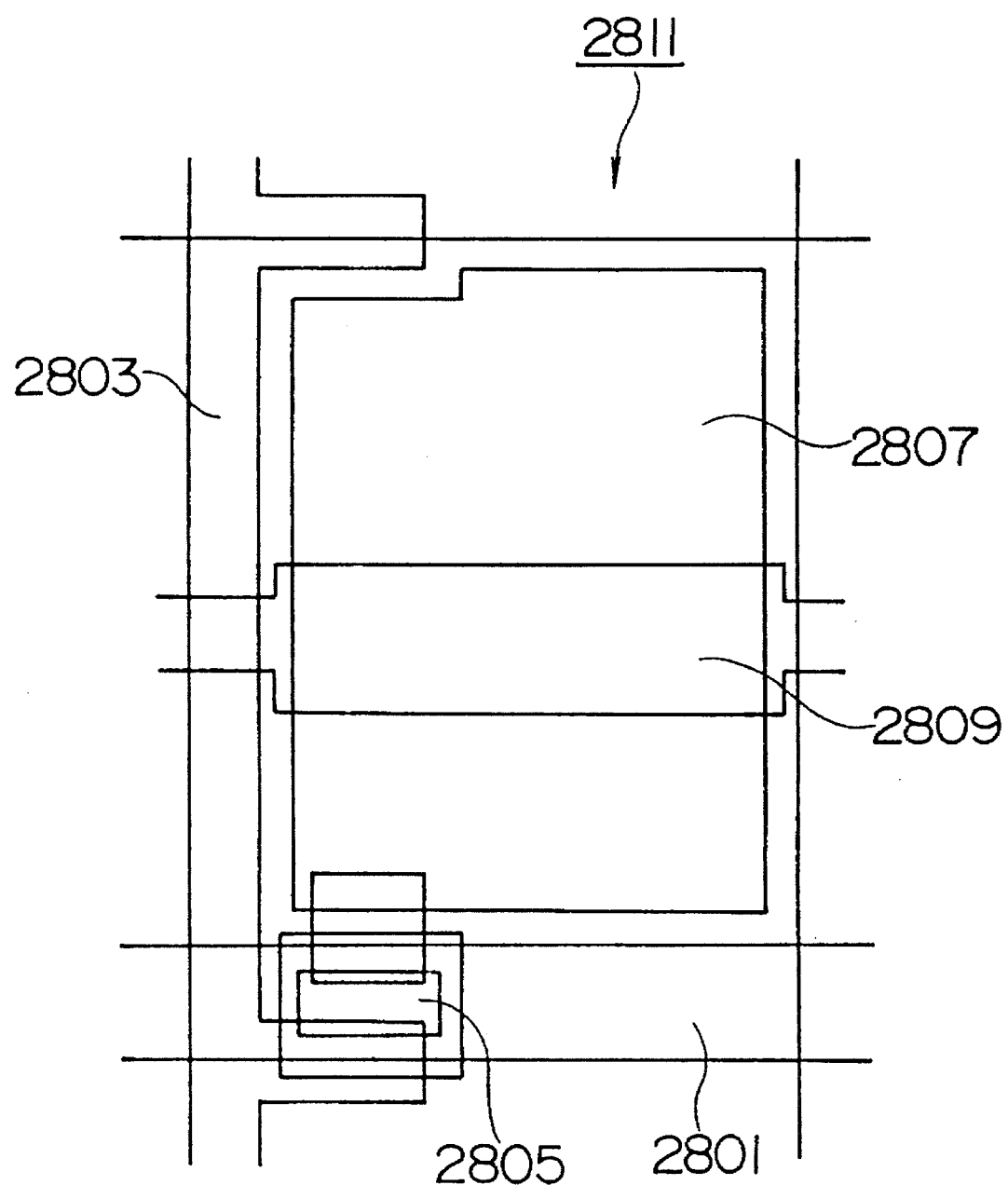
FIG. 28 is a plane view showing the construction of a pixel over a conventional array substrate.
Figure 29:
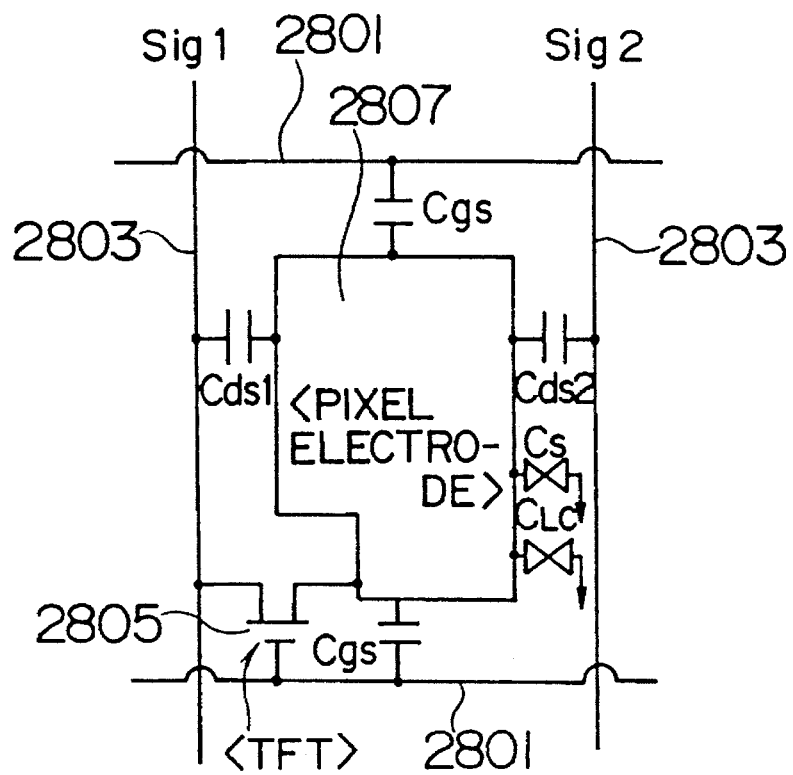
FIG. 29 is a schematic diagram showing an electric equivalent circuit of a conventional LCD.
Figure 30:
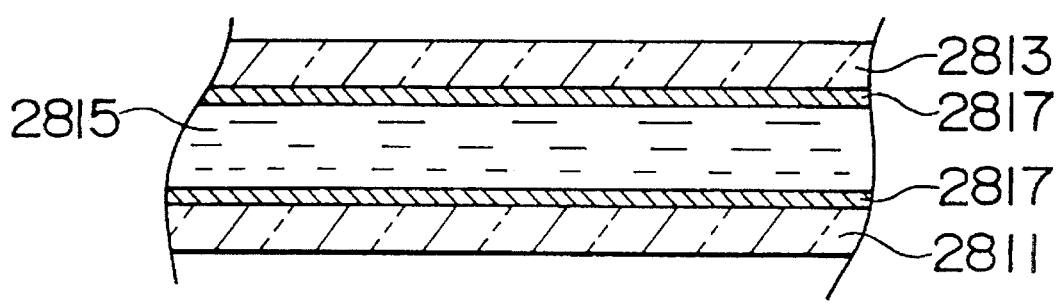
FIG. 30 is a sectional view showing the construction of the conventional LCD.

FIG. 27 is a plane view showing an LCD with a compensation portion 2701 according to the eleventh embodiment. The compensation portion 2701 is disposed so as to actively decrease the fluctuation of the pixel voltage shift $\Delta V_p$. This compensation portion 2701 forms a compensation capacitor $C_{gs}$ for the capacitor formed by the pixel electrode 109 and the scan line 103 which are overlapped. It was confirmed that according to the LCD of this embodiment, the fluctuation of the line width of the scan line is offset with that of the shield electrode which is an electrode of the storage capacitor and that the pixel voltage shift $\Delta V_p$ due to the fluctuation of the line width of the pixel electrode 109 can be offset.

However, since the compensation portion 2701 forms the $C_{gs}$, the capacitance thereof should be selected so that it does not adversely affect the display characteristics. In other words, in consideration of the production steps of the LCD, the size of the compensation portion 2701 should be as small as possible while the above-mentioned compensation effect is obtained.

When the shield electrode is used as a black matrix on the signal line side, a display defect due to disclination of liquid crystal material should not be observed. It is known that the disclination is caused by a horizontal electric field to the liquid crystal layer. This defect occurs at an end portion of a pixel electrode in a line shape. This disclination is affected by for example the orientation direction of the liquid crystal material in rubbing method. Thus, for the LCD according to the fifth embodiment, when it is used for an OA application, the orientation process is performed in a diagonal direction by the rubbing method. As a result, the disclination at the left end portion of a pixel electrode differs from that at the right end portion thereof. Thus, when a picture is displayed, the disclination is remarkable at the left end portion of the pixel electrode. However, it is seen that the disclination does not occur at the right end portion. Thus, in this case, when the shield electrode is more overlapped with the left end portion than with the right end portion, the shield electrode can prevent the display defect due to the disclination.

In addition, since the disclination may take place at a shoulder portion such as an alignment layer or a passivation film in contact with a liquid crystal layer. To prevent this disclination, a shoulder such as a protection film (passivation film) should not be formed over the pixel electrode. It is preferred that the shoulder is formed in the pixel electrode with a space of around 10 μm. Moreover, it is preferred that the end portion of the protection film is formed in a gradual taper shape.

According to this embodiment, for the material of the shield electrode, a metal material such as Mo—Ta or Al is used. However, the present invention is not limited to such materials. When the resistance of the shield electrode which is used in common with an electrode of a storage capacitor is high, the voltage fluctuation due to time constant becomes large. Thus, a material which has high conductivity and which properly fits to the LCD forming method can be used.

Moreover, according to the present invention, the pattern, layer construction, and materials of the TFT array are not limited to those described in this embodiment. They can be changed according to the specifications of each LCD of the present invention, unless they depart from the spirit of the present invention.

As described above, according to the present invention, the LCD which allows parasitic capacitances formed between the pixel electrode and the scan line and between the pixel electrode and the signal line to be decreased, prevents uneven luminance and cross talk of display, and provides a high picture display quality is accomplished.

EMBODIMENT 12

Figure 31:
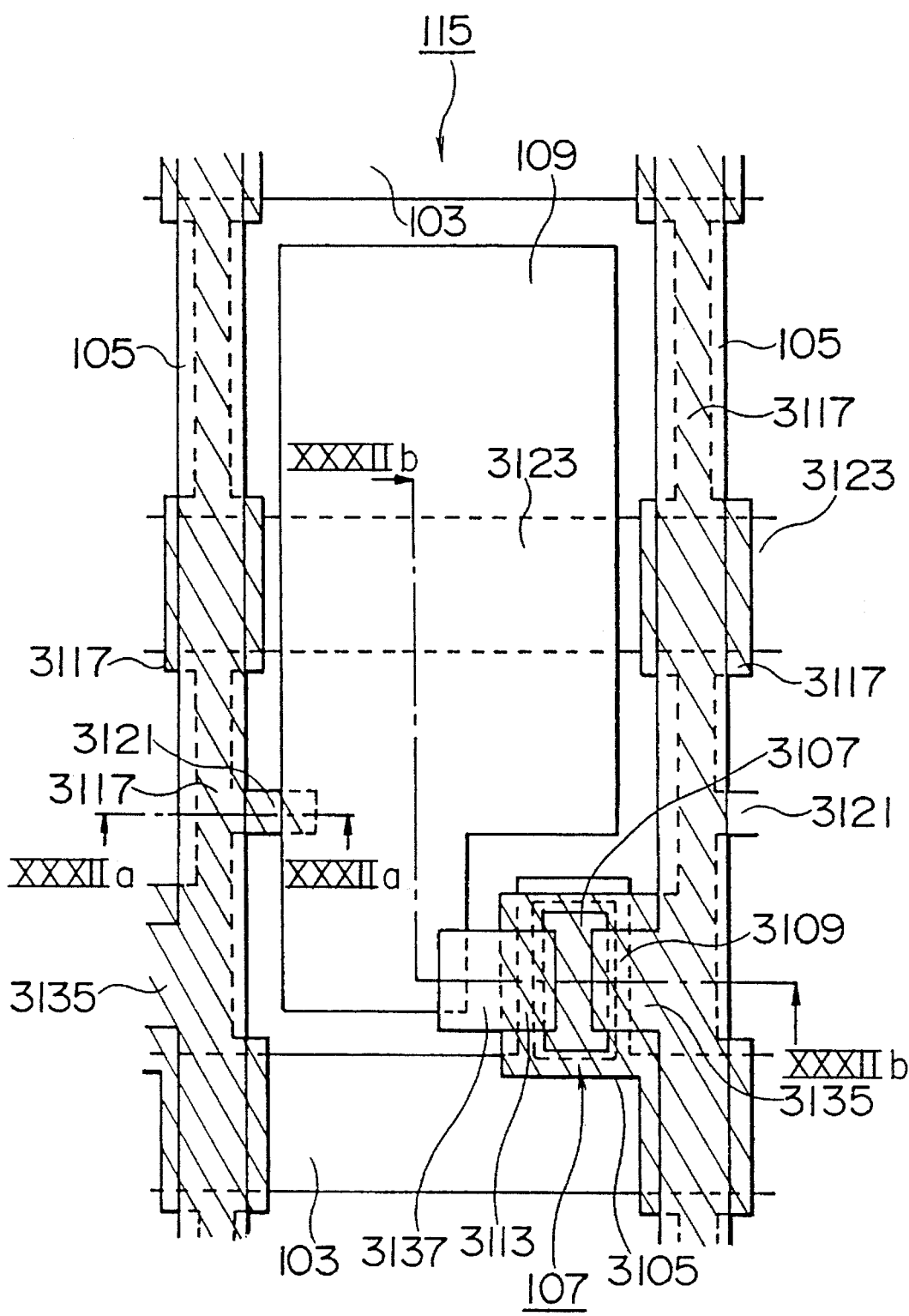
FIG. 31 is a plane view showing the construction of a pixel over an array substrate according to a twelfth embodiment of the present invention.
Figure 32A:
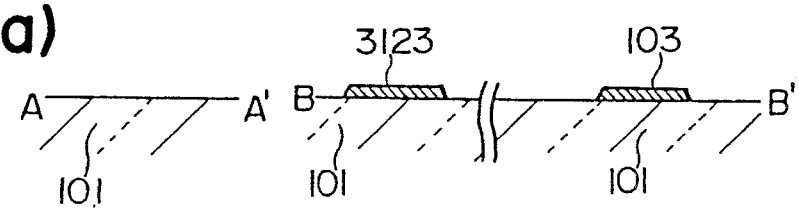
FIGS. 32 (a) to (e) are sectional views showing a patterning process of the array substrate of the twelfth embodiment (these sectional views being taken along line XXXIIa—XXXIIa and line XXXIIIb—XXXIIIb showing the construction of the layers of FIG. 31.
Figure 32B:
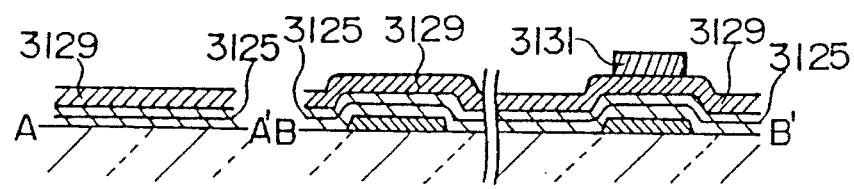
Figure 32C:
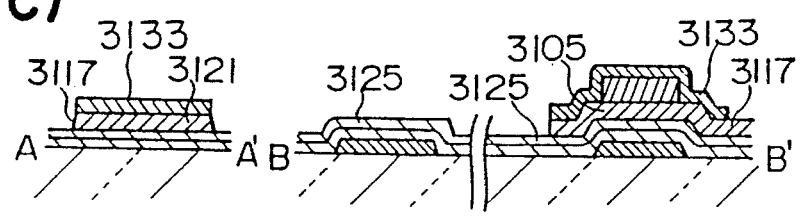
Figure 32D:
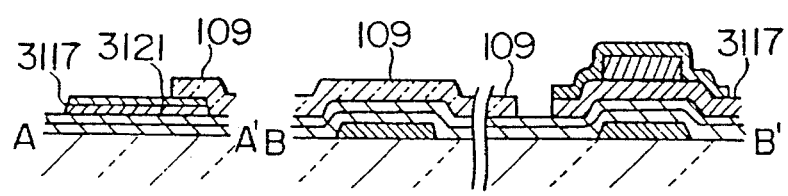
Figure 32E:
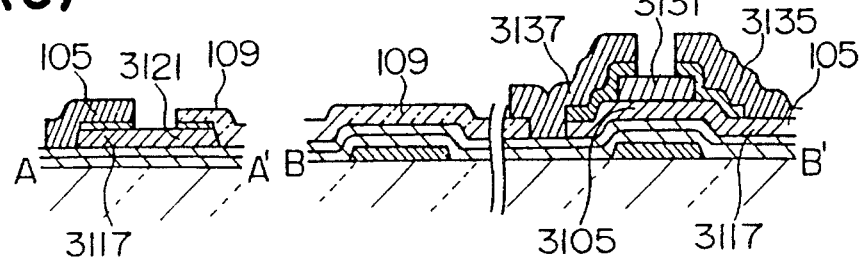

With reference to FIGS. 31 and 32, a twelfth embodiment according to the present invention will be described. For simplicity, in this embodiment, the same portions as the above-mentioned embodiments are denoted by the same reference numerals as the corresponding figures.

A plurality of scan lines 103 and a plurality of signal lines 105 are intersectionally disposed over a substrate. At a portion where scan lines 103 and signal lines 105 are intersected, a TFT 107 is formed. The TFT 107 has an activation layer 3105 composed of a—Si. A gate 3107 is formed by a scan line 103. A pixel electrode 109 is connected to a source 3113. The activation layer and ohmic contact layer 3105 of the TFT 107 are overlapped with the pixel electrode 109. The semiconductor film 3105 is also overlapped with the signal line 105. Thus, a semiconductor film 3117 is formed. In this construction, major portions of the TFT array substrate 115 are formed. In FIG. 31, for simple illustration, the semiconductor film 3117 (including a protrusion 3121 and the activation portion 3105) which is a feature of the present invention is hatched.

As shown in FIG. 31, the semiconductor film 3117 is disposed just below the signal line 105 and in the TFT 107. In addition, the semiconductor film 3117 is patterned so as to form a protrusion which is in contact with a portion of the periphery of the pixel electrode 109. In the TFT 107, the semiconductor film 3117 is used for the activation layer 3105 and ohmic contact layer. In other words, the semiconductor film 3117 and the activation layer 3105 of the TFT 107 are semiconductor films which are formed on the same layer and composed of the same s—Si material and n⁺a—Si material. In addition, as described above, the activation layer 3105 and the semiconductor film 3117 are integrally formed.

For example, in the production method according to the first embodiment, when the pixel electrode is formed in a land shape, it is in a floating state and not connected to any portion. In addition, since the pixel electrode is the outermost layer, it is liable to be charged. However, with the semiconductor film 3117, static electricity charged on the pixel electrode 109 can be gradually discharged in the production step of the array substrate. Thus, since static electricity does not rapidly move from the pixel electrode 109 to various electrodes such as a storage capacitor electrode 3123 and a scan line 103 which have a high conductivity, it does not damage a gate insulation film 3125 on the route thereof. Thus, a dielectric breakdown does not take place in the gate insulation film 3125. Therefore, display defects such as point defects due to shortcircuits between the storage capacitor electrode 3123 and the scan line 103 and between the electrode 3123 and the pixel electrode 109 can be suppressed, thereby providing the LCD with a high picture display quality. A storage capacitor (capacitance; $C_s$) is formed of the storage capacitor electrode 3123, the gate insulation film 3125, and the pixel electrode 109. Thus, the portion that a dielectric breakdown is most likely to occur due to discharging is the gate insulation film 3125 disposed between the storage capacitor electrode 3123 and the pixel electrode 109.

Thus, by directly connecting the semiconductor film 3117 which is composed of the same material a—Si as the activation layer 3105 to the pixel electrode 109, static electricity changed on the pixel electrode 109 can be discharged. This is because the semiconductor film composed of a—Si has both a conductive characteristic which allows a high- voltage and a weak-static electricity charged on the pixel electrode 109 to flow and a nonconductive characteristic which prevents a current from flowing at a normal operating voltage of the TFT.

In addition, according to the LCD shown in FIG. 31, the semiconductor film 3117 is disposed just below the signal line 105 and just over the storage capacitor electrode 3123, even if pin hole defects take place on an insulation film such as the gate insulation film 3125 formed just below the signal line 105 and just over the storage capacitor electrode 3123, inter- layer shortcircuit defects do not take place unless corresponding pin hole defects take place on the semiconductor film. Thus, the probability of occurrences of shortcircuit defects at such a portion can be remarkably suppressed. With these effects, according to the present invention, an LCD with a high picture display quality can be accomplished without display defects such as point defects.

With the LCD according to the present invention, the occurrences of point defects can be reduced by around 20% in comparison with the LCD of the related art reference.

Next, a method of producing a LCD according to this embodiment will be described.

A Mo—Ta alloy is deposited over a transparent substrate 101 for around 250 nm by for example CVD method so as to form a metal film. The metal film is patterned so as to form a scan line 103 and a storage capacitor electrode 3123 (see FIG. 32 (a)).

For example, a SiO$_x$ film is deposited so as to form a gate insulation film 3125 which is used in common with an interlayer insulation film. The SiO$_x$ film is deposited twice so as to prevent shortcircuit defects due to pin hole defects or the like which take place in the film forming step and to have a predetermined thickness of the film. An a—Si film is deposited over the gate insulation film 3125 so as to form a semiconductor film 3129. For example, a $SiN_x$ film as an insulation film is deposited over the semiconductor film 3129. The insulation film is etched and patterned so as to form a channel protection film 3131 (see FIG. 32 (b)).

An n⁺a—Si film is deposited and patterned so as to form an ohmic contact layer 3133. At this point, the ohmic contact layer 3133 is connected to each other on the channel protection film 3131. This connected portion is separated in a later step. The ohmic contact layer 3133 is etched and patterned so that the semiconductor film 3129 is left below the TFT 107 and the scan line 103. Thus, a semiconductor film 3117 is formed. At this point, a protrusion 3121 is formed so that it is overlapped with a pixel electrode 109 which will be formed in a later step. The semiconductor film 3117 and an activation layer 3105 of the TFT 107 are integrally connected. Thus, with the semiconductor film 3129, the activation layer 3105 of the TFT 107 and the semiconductor film 3117 having the protrusion 3121 are formed (see FIG. 32 (c)).

A transparent conductive film such as an ITO film is deposited and patterned so as to form a pixel electrode 109. At this point, the pixel electrode 109 is patterned so that it is overlapped with the protrusion 3121 of the semiconductor film 3117 (see FIG. 32 (d)).

A Mo/Al/Mo metal film is deposited and patterned so as to form a scan line 103 and a source electrode 3137. The scan line 103 and the drain electrode 3135 are integrally formed. The drain electrode 3135 is connected to the drain 3109 of the TFT 107. The source electrode 3137 connects a source 3113 of the TFT 107 and the pixel electrode 109. The n⁺a—Si film left over the channel protection film 3131 is etched and removed (see FIG. 32 (e)). Thus, a TFT array substrate 115 is completed. To further improve the reliability, a passivation film composed of for example a $SiN_x$ film can be disposed over the entire surface of the TFT array substrate 115.

The TFT array substrate 115 and an opposite substrate with an opposite electrode are oppositely disposed through a spacer so as to have a predetermined cell gap. The periphery of the TFT array substrate 115 and the opposite substrate is sealed with a sealing agent so as to form an empty cell. A liquid crystal material is injected into the empty cell and sealed. Liquid crystal drive circuit and so forth are connected. Thus, the LCD according to the present invention is completed.

In the above embodiment, after the LCD is completed, the protrusion 3121 of the semiconductor film 3117 is integrally connected to the semiconductor film 3117. This protrusion 3121 can be disconnected from the semiconductor film 3117 after the LCD is completed. In other words, after the TFT array substrate 115 is almost completed, static electricity charged on the pixel electrode 109 connected to each lead does not cause a dielectric breakdown, the protrusion 3123 can be disconnected. For example, when the ohmic contact layer 3133 over the channel protection film 3131 is etched, the protrusion 3121 which is exposed between the scan line and the pixel electrode 109 can be etched and disconnected, the protrusion 3123 can be disconnected.

EMBODIMENT 13

Figure 33A:
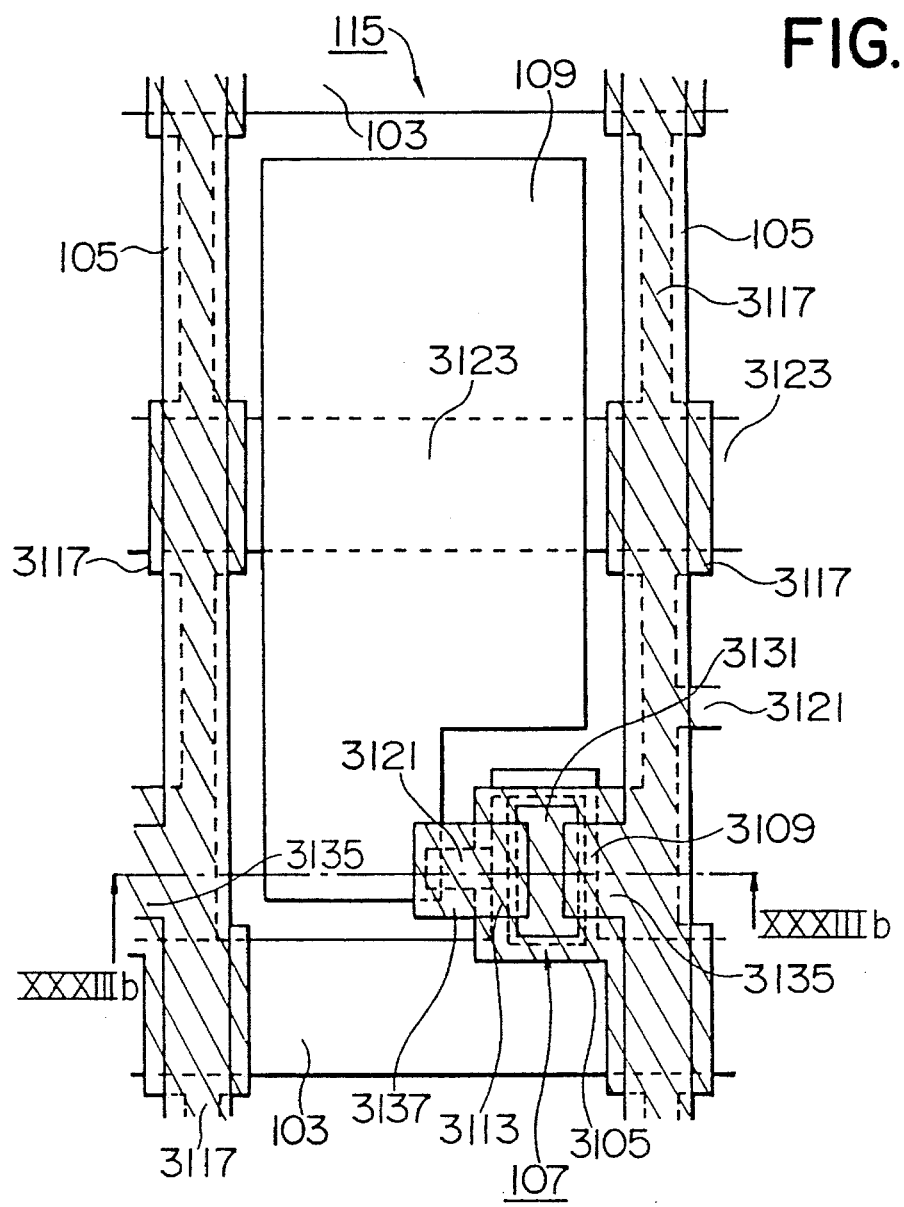
FIG. 33 (a) is a plane view showing the construction of a pixel over an array substrate according to a thirteenth embodiment of the present invention.
Figure 33B:
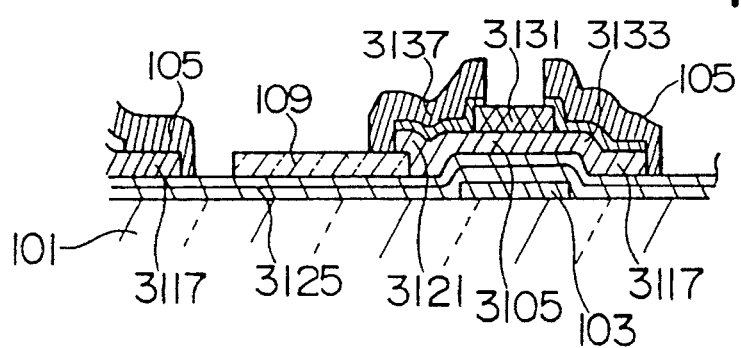

With reference to FIGS. 33 (a) and (b), a thirteenth embodiment according to the present invention will be described. For simplicity, in this embodiment, the same portions as the above-mentioned embodiments are denoted by the same reference numerals as corresponding figures.

An LCD according to the thirteenth embodiment is the same as that according to the twelfth embodiment except that a protrusion 3121 of a semiconductor film 3117 is formed just below a source electrode 3137. In other words, the protrusion 3121 of the semiconductor film 3117 is overlaid with a pixel electrode 109 through the source electrode 3137. In the thirteenth embodiment, since the protrusion 3121 is fully overlaid with the source electrode 3137, while and after the TFT array substrate 115 is produced and completed, the semiconductor film 3117 and the protrusion 3121 are still connected.

As in the twelfth embodiment, the LCD of the thirteenth embodiment can provide a high picture display quality with suppressing display defects such as point defects on the display.

EMBODIMENT 14

Figure 34A:
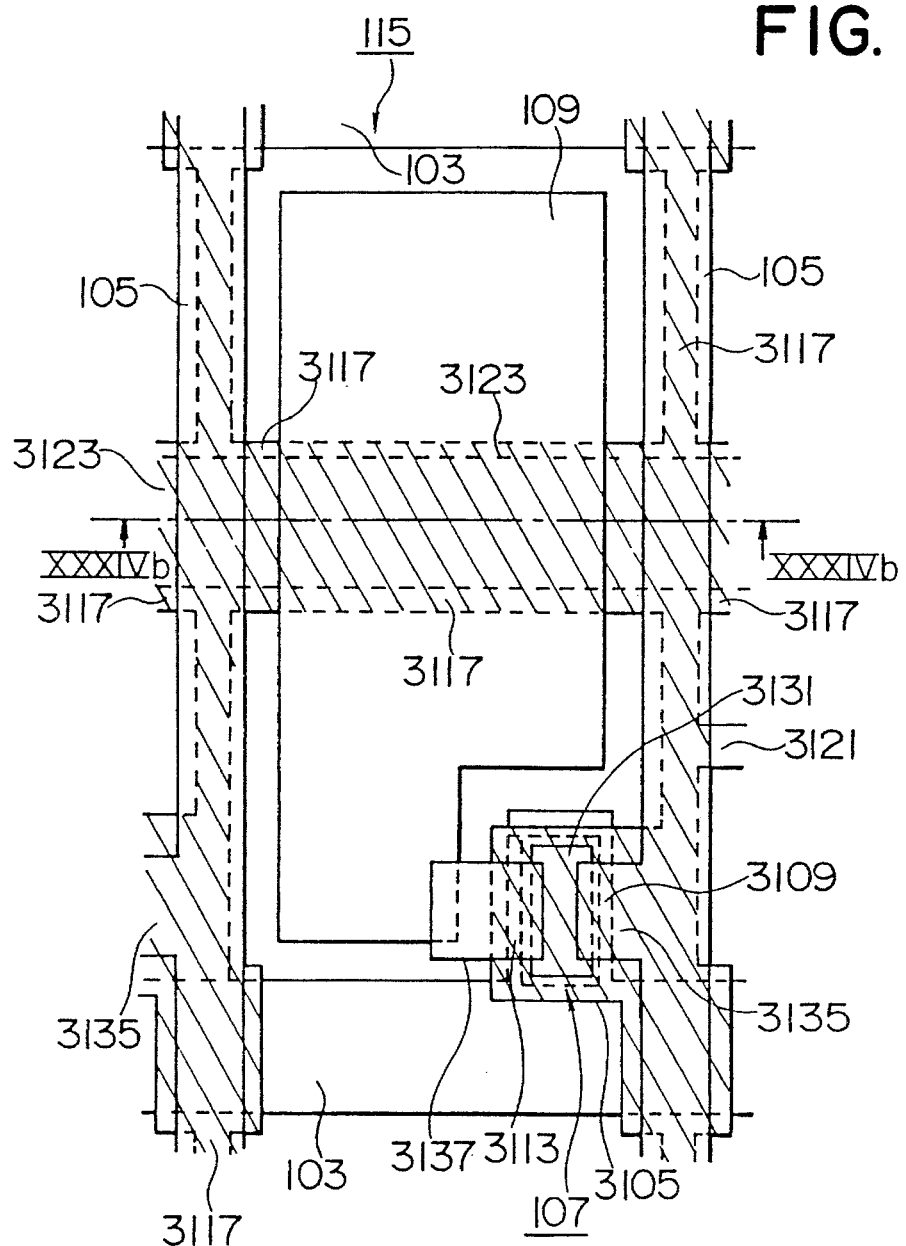
FIG. 34 (a) is a plane view showing the construction of a pixel over an array substrate according to a fourteenth embodiment of the present invention.
Figure 34B:
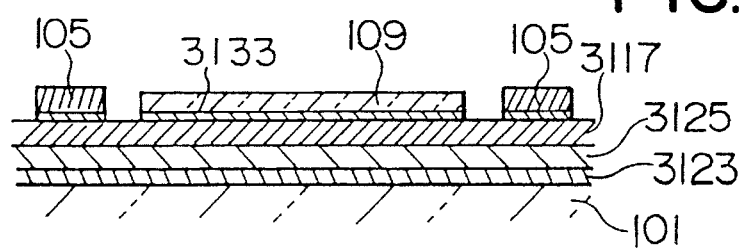

With reference to FIGS. 34 (a) and (b), a fourteenth embodiment according to the present invention will be described. For simplicity, in this embodiment, the same portions as the above-mentioned embodiments are denoted by the same reference numerals as corresponding figures.

According to an LCD of the fourteenth embodiment, a semiconductor film 3117 is overlaid with a pixel electrode 109. In addition, the semiconductor film 3117 is overlaid with a channel protection film 3125 as an insulation film disposed over a storage capacitor electrode 3123. Thus, the semiconductor film 3117 is almost fully overlaid with the pixel electrode 109 and they are contacted. The pixel electrode 109 forms a storage capacitor (capacitance; $C_s$) electrode. Except for the pattern of the semiconductor film 3117, the construction of the fourteenth embodiment is the same as that of the twelfth and thirteenth embodiments. In this construction, the contacting area of the pixel electrode 109 and the semiconductor film 3117 becomes wider than that of the protrusion 3121 of the above-mentioned embodiments. In addition, since the semiconductor film is left in the storage capacitor portion, the probability where pin holes occur in the insulation film is very low. Thus, the LCD according to the fourteenth embodiment can provide a high picture display quality with suppressing display defects such as point defects and line-shape defects on the screen.

EMBODIMENT 15

Figure 35A:
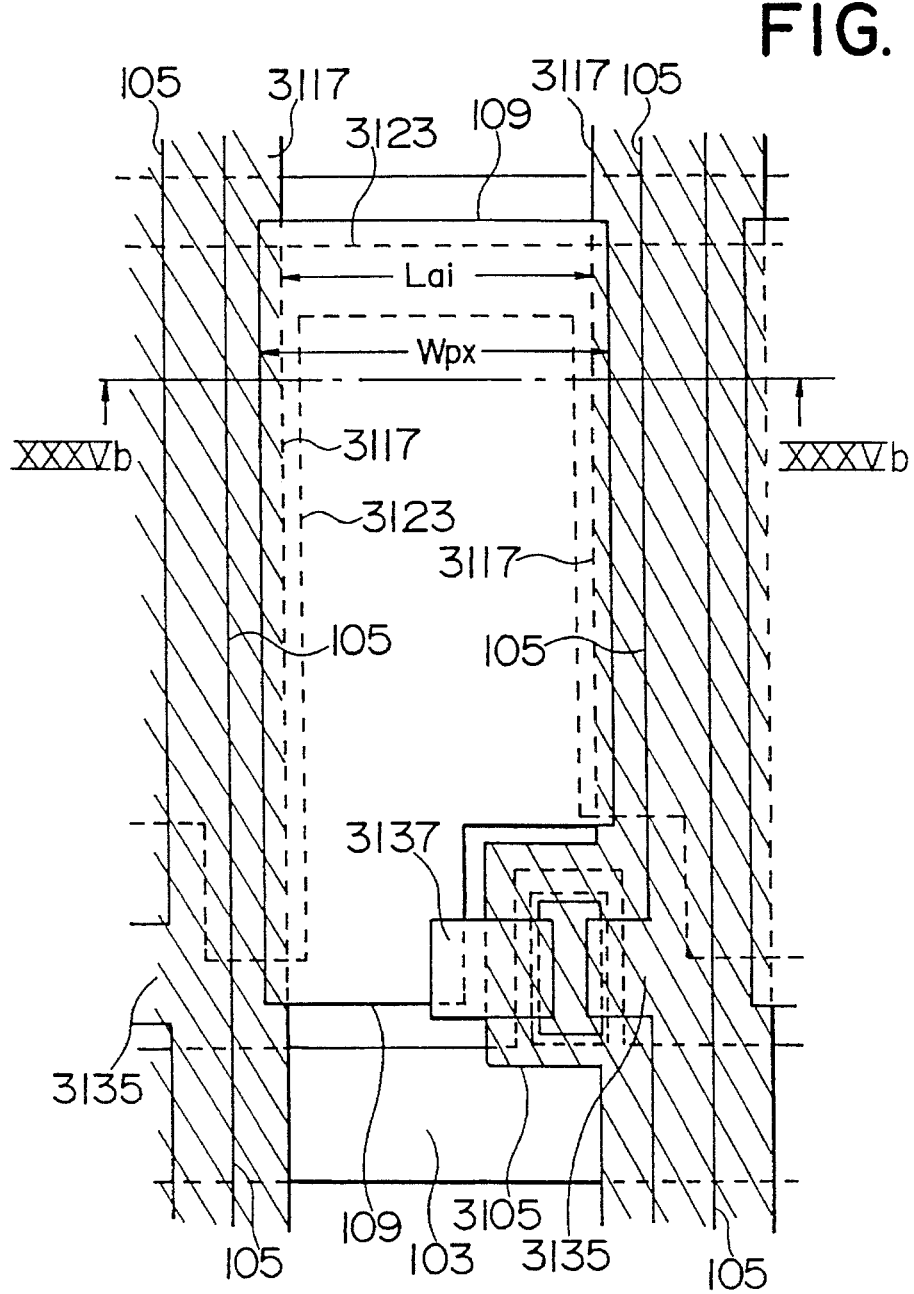
FIG. 35 (a) is a plane view showing the construction of a pixel over an array substrate according to a fifteenth embodiment of the present invention.
Figure 35B:
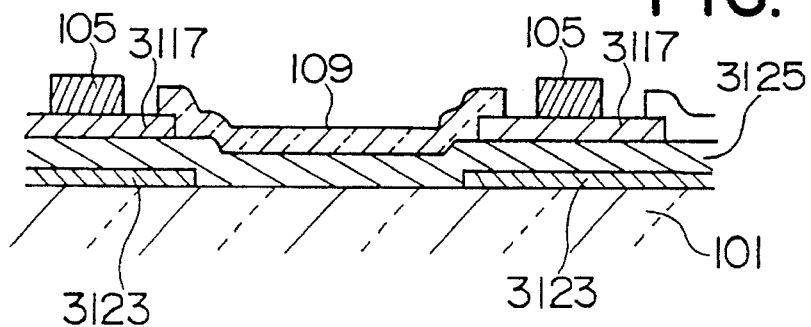

With reference to FIGS. 35 (a) and (b), a fifteenth embodiment according to the present invention will be described. For simplicity, in this embodiment, the same portions as the above-mentioned embodiments are denoted by the same reference numerals of corresponding figures.

According to an LCD of the fifteenth embodiment, a storage capacitor electrode 3123 is almost fully overlaid with a signal line 105. The storage capacitor electrode 3123 is used in common with a shield electrode disposed between the signal line 105 and a pixel electrode 109. In addition, since the storage capacitor electrode 3123 is disposed in the vicinity of the pixel electrode 109, the open aperture ratio of the pixel electrode 109 is high. In the plane view of FIG. 35, for clear illustration, the semiconductor film 3117 which is a feature of this embodiment is hatched.

In this construction, the area where the storage capacitor electrode 3123 is overlaid with the signal line 105 is wide. Thus, in a photo resist process or the like, pin holes and so forth tend to occur on the gate insulation film 3125. As a result, the probability where line-shaped display defects called cross-shorts occur becomes high. To prevent these defects, the semiconductor film 3117 is fully overlaid with the signal line. With the semiconductor film 3117, shortcircuit defects of the signal line 105 and the storage capacitor electrode 3123 disposed thereunder can be effectively prevented. In this case, due to the alignment margin in the patterning step of the signal line 105, the width of the semiconductor film 3117 should be wider than that of the signal line 105. The semiconductor film 3117 just below the signal line 105 is extended breadthwise so that the semiconductor film 3117 is overlaid with the pixel electrode 109. Thus, with the alignment margin of the signal line 105, the semiconductor film 3117 can be conductibly overlaid with the pixel electrode 109. However, at this point, if the semiconductor film 3117 is disposed at an inner position than the storage capacitor electrode 3123, the open aperture ratio of the pixel electrode 109 lowers. Thus, the outer periphery of the semiconductor film 3117 should be disposed outwardly by the alignment margin of the signal line 105.

Since the semiconductor film 3117 and the pixel electrode 109 are contacted in such a way, the LCD according to this embodiment can provide a high picture display quality with suppressing display defects such as point defects on the display.

The dielectrics of the storage capacitor (capacitance; $C_s$) formed between the pixel electrode 109 and the storage capacitor electrode 3123 which are disposed as upper, middle and lower electrodes are the gate insulation film 3125, the gate insulation film 3125, and the semiconductor film 3117. The fluctuation of the area where the semiconductor film 3117 is overlapped with and the pixel electrode 109 affects the capacitance ($C_s$) of the storage capacitor. To prevent this fluctuation, the fluctuation of the overlap of the semiconductor film 3117 and the pixel electrode 109 can be offset by the left and right pixels. In other words, the relation of $L_{si} \leq W_{px}$ should be satisfied where $L_{si}$ is the distance from one end to the other end of the semiconductor film 3117; and $W_{px}$ is the width of the pixel electrode 109. In addition, it is preferred that the semiconductor film 3117 is overlapped with both the sides of the pixel electrode 109.

Otherwise, the capacitance ($C_s$) of the storage capacitor fluctuates, resulting in an uneven luminance of a display picture. Alternatively, when electrodes and so forth are patterned by an optical aligner such as a stepper, junctions of shot blocks become remarkable.

Figure 36A:
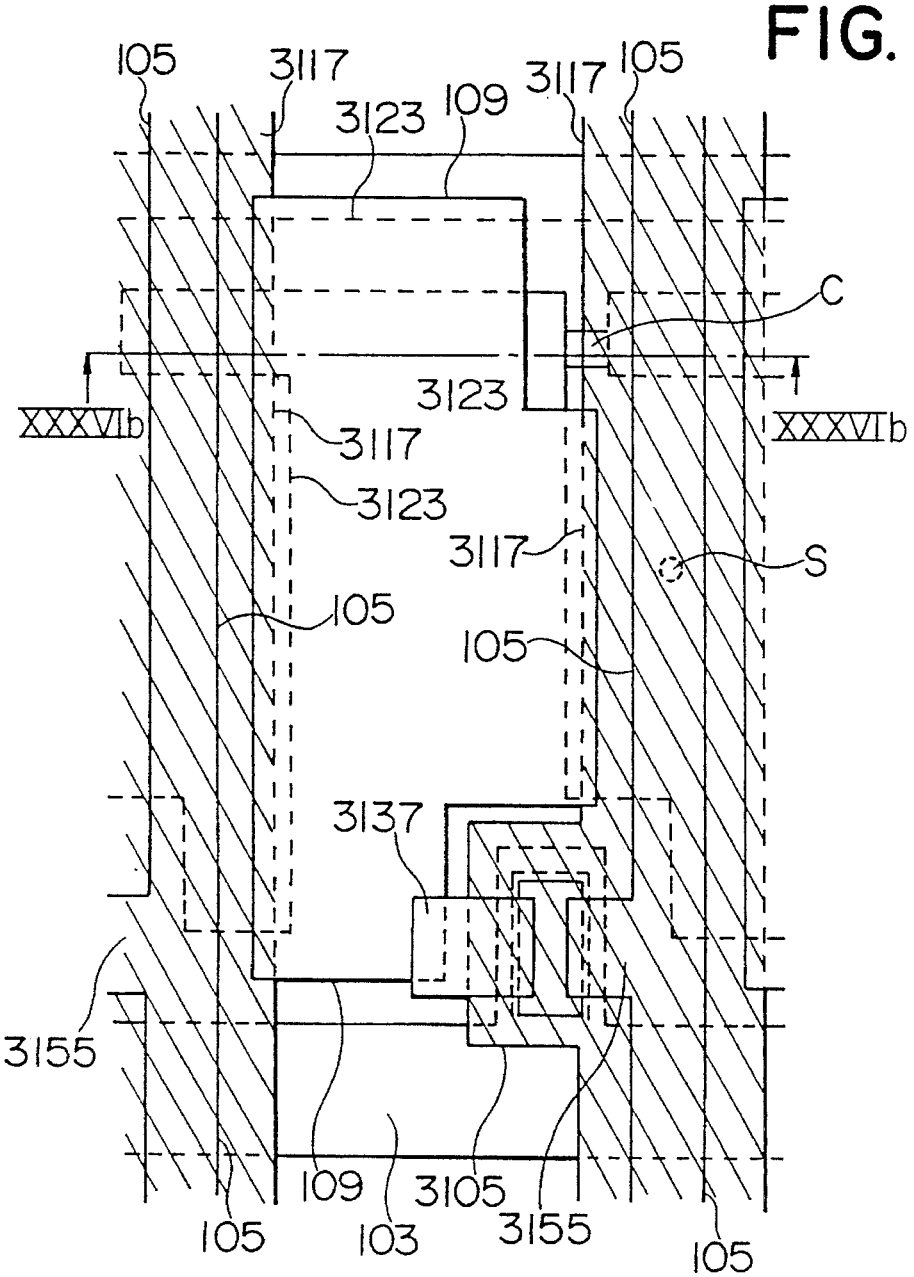
FIG. 36 (a) is a plane view showing the construction of a first modification according to the fifteenth embodiment of the present invention.
Figure 36B:
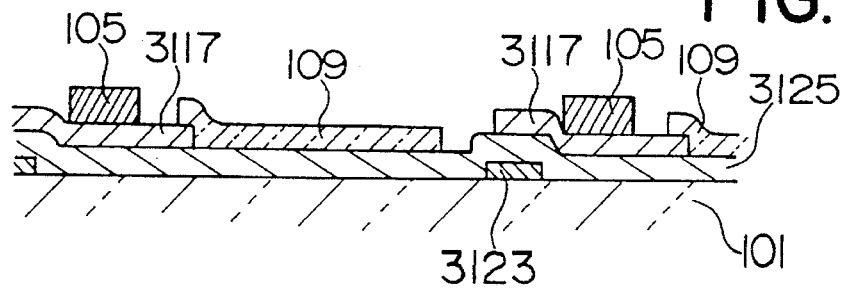

The pattern of the storage capacitor electrode 3123 for use in the LCD of the fifteenth embodiment is not limited to that described above. Rather, a pattern which is partially notched can be used. With such a notched pattern, after the array substrate is produced or the LCD is produced, even if a line-shaped defects occur between the storage capacitor electrode 3123 and the signal line 105 due to an inter-layer shortcircuit, such defects can be easily removed. For example, in FIG. 36, if an inter-layer shortcircuit denoted by S takes place between the storage capacitor electrode 3123 and the signal line 105, such a defect can be removed by cutting a portion C by laser. In FIG. 37, if an inter-layer shortcircut defect takes place at a portion S, the defect can be removed by cutting both a portion C shown in the figure and a portion C of the next pixel. However, in this case, a predetermined voltage should be applied to the storage capacitor electrode from the left and right sides of the substrate.

In experiments conducted by the inventors of the present invention, solid laser rays were collected by a microscope and radiated to the storage capacitor electrode so as to blow off such portions. Thus, if a portion to be cut is overlapped with another film, a shortcircuit defect takes therebetween. To prevent this shortcircuit defect, such a pattern was selected.

In each embodiment according to the present invention, LCDs with a bottom gate type (inverse stagger type) a—Si TFT as the TFT 107 were described. However, the present invention is not limited to such LCDs. Rather, the present invention can be applied to LCDs with a coplannar type TFT.

In the twelfth and thirteenth embodiments, only one protrusion 3121 was disposed on a semiconductor film 3117. However, the present invention is not limited to such a construction. Rather, a plurality of protrusions 3121 can be disposed. In this construction, electric charges locally present on the pixel electrode 109 can be more effectively removed.

For a semiconductor material used for the semiconductor film 3117, the present invention is not limited to a—Si which were used in the above-mentioned embodiments. Rather, for example, a polycrystal silicon film can be used.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An active matrix type liquid crystal display device, comprising:
    an array substrate, said array substrate including;
        a first substrate,
        a plurality of scan lines and a plurality of signal lines formed on said first substrate,
        said plurality of signal lines intersecting said plurality of scan lines and insulated from said plurality of scan lines,
        a thin film transistor element having a gate portion, drain portion and source portion, and disposed at each intersection of said plurality of scan lines and signal lines, said gate portion being connected to said scan line, and said drain portion being electrically connected to said signal line,
        a separate pixel electrode electrically connected to said source portion of each said thin film transistor element,
        a shield electrode layer extending in lapped relation with at least one side of said pixel electrode and in lapped relation with a portion of a signal line, the intersecting ones of said scan and signal lines being in proximate relation to adjacent sides of said pixel electrode, said shield electrode layer extending in lapped relation with at least one side of a plurality of said pixel electrodes, and
        an insulation layer disposed between said shield electrode layer and said pixel electrode and said portion of said signal line;
    a second substrate having an opposite electrode and disposed in opposed relation with said array substrate; and
    a liquid crystal layer disposed between said array and second substrates.

2. The active matrix type liquid crystal display device as set forth in claim 1, wherein said shield electrode layer extends in lapped relation with a portion of said signal line, said portion of said signal line being coextensive with the side of said pixel electrode in proximate relation thereto.

3. The active matrix type liquid crystal display device as set forth in claim 1, wherein said shield electrode layer and a gate electrode layer of said thin film transistor element are portions of a single layer.

4. An active matrix type liquid crystal display device, comprising:

an array substrate, said array substrate including;
a first substrate,
a plurality of scan lines and a plurality of signal lines formed on said first substrate,
said plurality of signal lines intersecting said plurality of scan lines and insulated from said plurality of scan lines,
a thin film transistor element having a gate portion, drain portion and source portion, and disposed at each intersection of said plurality of scan lines and signal lines, said gate portion being connected to said scan line, and said drain portion being electrically connected to said signal line,
a separate pixel electrode electrically connected to said source portion of each said thin film transistor element,
a shield electrode layer extending in lapped relation with three sides of said pixel electrode and with a portion of one of intersecting ones of said scan lines and signal lines, the intersecting ones of said scan and signal lines being in proximate relation to adjacent sides of said pixel electrode, said shield electrode layer extending in lapped relation with at least one side of a plurality of said pixel electrodes, a fourth side of said pixel electrode in non-lapped relation with said shield electrode layer being electrically connected to said source portion of said thin film transistor, and
an insulation layer disposed between said shield electrode layer and said pixel electrode and said portion of said one of said scan and signal lines;
a second substrate having an opposite electrode and disposed in opposed relation with said array substrate; and
a liquid crystal layer disposed between said array and second substrates.

5. An active matrix type liquid crystal display device, comprising:

an array substrate, said array substrate including;
a first substrate,
a plurality of scan lines and a plurality of signal lines formed on said first substrate,
said plurality of signal lines intersecting said plurality of scan lines and insulated from said plurality of scan lines,
a thin film transistor element having a gate portion, drain portion and source portion, and disposed at each intersection of said plurality of scan lines and signal lines, said gate portion being connected to said scan line, and said drain portion being electrically connected to said signal line,
a separate pixel electrode electrically connected to said source portion of each said thin film transistor element,
a shield electrode layer extending in lapped relation with at least one side of said pixel electrode and with a portion of one of intersecting ones of said scan lines and signal lines, the intersecting ones of said scan and signal lines being in proximate relation to adjacent sides of said pixel electrode, said shield electrode layer extending in lapped relation with at least one side of a plurality of said pixel electrodes,
an insulation layer disposed between said shield electrode layer and said pixel electrode and said portion of said one of said scan and signal lines, and
a storage capacitor formed at a location where said shield electrode is lapped with the side of said pixel electrode;
a second substrate having an opposite electrode and disposed in opposed relation with said array substrate; and
a liquid crystal layer disposed between said array and second substrates,
wherein a width $W_{cs}$ of said shield electrode layer and said pixel electrode in lapped relation, is given by the following equation:

$$0.7\, W_{cs}^{opt} < W_{cs} < 2 W_{cs}^{opt}$$

where $W_{cs}^{opt}$ is an optimum lap width having a minimum deviation of a pixel voltage shift,
where $$W_{cs}^{opt} = (L_g \cdot L_{cs} \cdot C_{si} - 2\beta \cdot C_{1c-max}) / (2 L_{cs} \cdot C_{si})$$

where
$L_g$ is the width of the gate electrode;
$L_{cs}$ is the length of the center line of the portion where the pixel electrode and the shield electrode which forms a storage capacitor is overlapped;
$C_{si}$ is the capacitance of the storage capacitor per unit si area;
$C_{1c-max}$ is the maximum capacitance of one pixel of the LCD;
$C_{1c-min}$ is the minimum capacitance of one pixel of the LCD; and
$\beta$ is a constant (where $\beta = (C_{1c-max} + C_{1c-min}) / 2 C_{1c-max}$).

6. An active matrix type liquid crystal display device, comprising:

an array substrate, said array substrate including;
a first substrate,
a plurality of scan lines and a plurality of signal lines formed on said first substrate,
said plurality of signal lines intersecting said plurality of scan lines and insulated from said plurality of scan lines,
a thin film transistor element having a gate portion, drain portion and source portion, and disposed at each intersection of said plurality of scan lines and signal lines, said gate portion being connected to said scan line, and said drain portion being electrically connected to said signal line,
a separate pixel electrode electrically connected to said source portion of each said thin film transistor element,
a shield electrode layer extending in lapped relation with at least one side of said pixel electrode and with a portion of one of intersecting ones of said scan lines and signal lines, the intersecting ones of said scan and signal lines being in proximate relation to adjacent sides of said pixel electrode, said shield electrode layer extending in lapped relation with at least one side of a plurality of said pixel electrodes,
wherein said shield electrode layer and said first substrate are held at a common electric potential; and an insulation layer disposed between said shield electrode layer and said pixel electrode and said portion of said one of said scan and signal lines;

a second substrate having an opposite electrode and disposed in opposed relation with said array substrate; and a liquid crystal layer disposed between said array and second substrates.

* * * * *